US012344292B2

(12) United States Patent
Senna et al.

(10) Patent No.: US 12,344,292 B2
(45) Date of Patent: Jul. 1, 2025

(54) TECHNIQUES AND ASSOCIATED SYSTEMS AND METHODS FOR DETERMINING TRAIN MOTION CHARACTERISTICS

(71) Applicant: Humatics Corporation, Waltham, MA (US)

(72) Inventors: Joshua Senna, Brookline, MA (US); James Campbell Kinsey, Brookline, MA (US); Arihant Lunawat, Watertown, MA (US); Mike Einhorn, Madison, AL (US); Devon Reed Clark, Boston, MA (US)

(73) Assignee: Humatics Corporation, Waltham, MA (US)

( * ) Notice: Subject to any disclaimer, the term of this patent is extended or adjusted under 35 U.S.C. 154(b) by 970 days.

(21) Appl. No.: 17/090,635

(22) Filed: Nov. 5, 2020

(65) Prior Publication Data

US 2021/0129878 A1     May 6, 2021

Related U.S. Application Data

(60) Provisional application No. 62/931,481, filed on Nov. 6, 2019.

(51) Int. Cl.
*B61L 25/02*     (2006.01)
*B61L 15/00*     (2006.01)
(Continued)

(52) U.S. Cl.
CPC ......... *B61L 25/021* (2013.01); *B61L 15/0027* (2013.01); *B61L 25/026* (2013.01);
(Continued)

(58) Field of Classification Search
CPC .... B61L 25/021; B61L 15/0027; B61L 3/006; H01Q 1/3225; G01S 11/02
See application file for complete search history.

(56) References Cited

U.S. PATENT DOCUMENTS 5,283,589 A     2/1994    Blevins
5,420,883 A *   5/1995    Swensen ............... G01S 5/0009
                                                  375/138

(Continued)

FOREIGN PATENT DOCUMENTS

CN        107640164 A     1/2018
CN        108639107 A    10/2018
(Continued)

OTHER PUBLICATIONS

International Preliminary Report on Patentability for International Application No. PCT/US2020/059077 mailed May 19, 2022.
(Continued)

*Primary Examiner* — Wade Miles
*Assistant Examiner* — Mohammed Yousef Abuelhawa
(74) *Attorney, Agent, or Firm* — Wolf, Greenfield & Sacks, P.C.

(57) ABSTRACT

Described herein are techniques for determining motion characteristics (e.g., position, velocity, acceleration, etc.) of one or more trains traveling along a train track, such that train control systems may have the information needed to safely operate the trains at higher speeds and with shorter separation between trains. In accordance with various embodiments, systems and methods described herein may be configured to determine a position, velocity, and/or acceleration of a train traveling along a train track. In some embodiments, the motion characteristics may be determined one or more radio frequency antennas onboard the train, such as in communication with one or more anchor nodes positioned adjacent the train track. Alternatively or additionally, in some embodiments motion characteristics may be determined using one or more one or more inertial measurement units (IMUs) onboard the train.

16 Claims, 12 Drawing Sheets

(51) Int. Cl.
*G01S 11/02* (2010.01)
*H01Q 1/32* (2006.01)

(52) U.S. Cl.
CPC ............ *G01S 11/02* (2013.01); *H01Q 1/3225* (2013.01); *B61L 25/028* (2013.01)

(56) References Cited

U.S. PATENT DOCUMENTS

| | | |
|---|---|---|
| 5,907,294 A | 5/1999 | Welte et al. |
| 5,950,966 A | 9/1999 | Hungate et al. |
| 6,032,905 A | 3/2000 | Haynie |
| 6,054,950 A | 4/2000 | Fontana |
| 6,113,037 A | 9/2000 | Pace |
| 6,133,876 A | 10/2000 | Fullerton et al. |
| 6,232,887 B1 | 5/2001 | Carson |
| 6,308,117 B1 | 10/2001 | Ryland et al. |
| 6,323,785 B1 | 11/2001 | Nickell et al. |
| 6,371,416 B1 | 4/2002 | Hawthorne |
| 6,587,763 B2 | 7/2003 | Ishikawa |
| 6,597,293 B1 | 7/2003 | Harrison |
| 6,666,411 B1 | 12/2003 | Hart et al. |
| 6,759,948 B2 | 7/2004 | Grisham et al. |
| 6,917,284 B2 | 7/2005 | Grisham et al. |
| 6,957,131 B2 | 10/2005 | Kane et al. |
| 7,036,774 B2 | 5/2006 | Kane et al. |
| 7,075,427 B1 | 7/2006 | Pace et al. |
| 7,148,791 B2 | 12/2006 | Grisham et al. |
| 7,215,698 B2 | 5/2007 | Darby et al. |
| 7,379,800 B2 | 5/2008 | Breed |
| 7,624,952 B1 | 12/2009 | Bartek |
| 7,731,129 B2 | 6/2010 | Stull et al. |
| 7,990,283 B2 | 8/2011 | Breed |
| 8,063,825 B1 | 11/2011 | Yang |
| 8,200,380 B2 | 6/2012 | Ghaly |
| 8,344,877 B2 | 1/2013 | Sheardown et al. |
| 8,469,319 B2 | 6/2013 | Kiss, Jr. et al. |
| 8,477,021 B2 | 7/2013 | Slack |
| 8,477,067 B2 | 7/2013 | Kanner |
| 8,812,227 B2 | 8/2014 | Carlson et al. |
| 8,874,359 B2 | 10/2014 | Douglas et al. |
| 8,918,237 B2 | 12/2014 | Morris |
| 9,002,546 B2 | 4/2015 | Whitwam et al. |
| 9,014,953 B2 | 4/2015 | Breed |
| 9,043,131 B2 | 5/2015 | Carlson et al. |
| 9,128,815 B2 | 9/2015 | Kanner et al. |
| 9,365,155 B2 | 6/2016 | Hathaway et al. |
| 9,542,852 B2 | 1/2017 | Cross et al. |
| 9,731,738 B2 | 8/2017 | Carlson et al. |
| 9,821,826 B2 | 11/2017 | Yamada |
| 9,840,260 B2 | 12/2017 | Naidu |
| 10,106,079 B2 | 10/2018 | Denny et al. |
| 10,179,595 B2 | 1/2019 | Carlson et al. |
| 10,179,596 B2 | 1/2019 | Bartek |
| 10,259,477 B2 | 4/2019 | LeFebvre et al. |
| 10,737,709 B2 | 8/2020 | Carlson et al. |
| 10,778,363 B2 | 9/2020 | Carlson et al. |
| 10,967,894 B2 | 4/2021 | Hilleary |
| 11,349,589 B2 | 5/2022 | Carlson et al. |
| 2003/0058131 A1 | 3/2003 | Grisham et al. |
| 2003/0135327 A1 | 7/2003 | Levine et al. |
| 2004/0056182 A1 | 3/2004 | Jamieson et al. |
| 2004/0130463 A1 | 7/2004 | Bloomquist et al. |
| 2004/0155760 A1 | 8/2004 | Grisham et al. |
| 2004/0155822 A1 | 8/2004 | Lien |
| 2004/0240565 A1 | 12/2004 | Santhoff et al. |
| 2005/0065726 A1* | 3/2005 | Meyer ................. B61L 25/023 701/19 |
| 2005/0143037 A1 | 6/2005 | Stratis et al. |
| 2005/0251337 A1 | 11/2005 | Rajaram |
| 2005/0275513 A1 | 12/2005 | Grisham et al. |
| 2006/0151672 A1 | 7/2006 | Heddebaut et al. |
| 2006/0199146 A1 | 9/2006 | Mandelkern et al. |
| 2007/0241888 A1 | 10/2007 | Mantovani et al. |
| 2007/0281745 A1 | 12/2007 | Parkulo et al. |
| 2007/0293153 A1 | 12/2007 | Molisch et al. |
| 2008/0150786 A1 | 6/2008 | Breed |
| 2008/0170533 A1 | 7/2008 | Cyzs et al. |
| 2009/0140887 A1 | 6/2009 | Breed et al. |
| 2009/0243397 A1 | 10/2009 | Cook et al. |
| 2009/0253439 A1 | 10/2009 | Gantner et al. |
| 2010/0039978 A1 | 2/2010 | Rangan |
| 2010/0124898 A1 | 5/2010 | Qu et al. |
| 2010/0235460 A1 | 9/2010 | Mochizuki et al. |
| 2010/0258682 A1 | 10/2010 | Fries et al. |
| 2011/0006912 A1 | 1/2011 | Sheardown et al. |
| 2011/0084854 A1 | 4/2011 | Johnson |
| 2011/0152971 A1 | 6/2011 | Nghiem et al. |
| 2011/0226910 A1 | 9/2011 | Bock et al. |
| 2011/0238242 A1 | 9/2011 | Nichter |
| 2011/0250836 A1 | 10/2011 | Guha et al. |
| 2011/0298579 A1 | 12/2011 | Hardegger et al. |
| 2012/0077537 A1 | 3/2012 | Muratov et al. |
| 2012/0182142 A1 | 7/2012 | Danielsson et al. |
| 2012/0182191 A1 | 7/2012 | King |
| 2012/0248261 A1 | 10/2012 | Nichter |
| 2012/0296562 A1 | 11/2012 | Carlson et al. |
| 2012/0326891 A1 | 12/2012 | Cross |
| 2013/0021215 A1 | 1/2013 | Suzuki et al. |
| 2013/0138276 A1 | 5/2013 | Soderi et al. |
| 2013/0214990 A1 | 8/2013 | Chiu |
| 2013/0237273 A1 | 9/2013 | Klein et al. |
| 2013/0256466 A1 | 10/2013 | Carlson et al. |
| 2014/0045547 A1 | 2/2014 | Singamsetty et al. |
| 2014/0104081 A1 | 4/2014 | Cross et al. |
| 2014/0173155 A1 | 6/2014 | Slattery |
| 2014/0229096 A1 | 8/2014 | Carlson et al. |
| 2015/0060608 A1 | 3/2015 | Carlson et al. |
| 2015/0097412 A1 | 4/2015 | Smith |
| 2015/0307119 A1 | 10/2015 | Ghaly |
| 2015/0329130 A1 | 11/2015 | Carlson et al. |
| 2015/0344050 A1 | 12/2015 | Yanai et al. |
| 2015/0346332 A1 | 12/2015 | Taylor, Jr. et al. |
| 2016/0046308 A1 | 2/2016 | Chung et al. |
| 2016/0176422 A1 | 6/2016 | Cross |
| 2016/0280240 A1 | 9/2016 | Carlson et al. |
| 2016/0349362 A1 | 12/2016 | Rohr et al. |
| 2017/0080961 A1 | 3/2017 | Cross et al. |
| 2017/0282944 A1 | 10/2017 | Carlson et al. |
| 2018/0045807 A1 | 2/2018 | Senna et al. |
| 2019/0071106 A1* | 3/2019 | Carlson .................. B61L 27/70 |
| 2019/0250069 A1* | 8/2019 | Samadani ............... F16C 19/52 |
| 2019/0263432 A1 | 8/2019 | Carlson et al. |
| 2019/0283787 A1 | 9/2019 | Carlson et al. |
| 2019/0337545 A1 | 11/2019 | Carlson et al. |
| 2020/0158656 A1* | 5/2020 | Chung .................. B61L 23/047 |
| 2020/0346674 A1* | 11/2020 | Staats ..................... B61L 29/28 |
| 2021/0039691 A1* | 2/2021 | Tione .................... B60T 17/228 |
| 2021/0046960 A1 | 2/2021 | Whittemore et al. |
| 2021/0046961 A1 | 2/2021 | Whittemore et al. |
| 2021/0070332 A1 | 3/2021 | Hanczor et al. |
| 2021/0094595 A1* | 4/2021 | Kälberer ............... B61L 25/025 |
| 2021/0129881 A1 | 5/2021 | Senna et al. |
| 2021/0155275 A1 | 5/2021 | Fisher et al. |
| 2022/0024504 A1* | 1/2022 | Batchelor ............ G01C 21/005 |
| 2022/0080955 A1 | 3/2022 | Diamond et al. |
| 2022/0084398 A1 | 3/2022 | Zhang et al. |
| 2022/0140931 A1 | 5/2022 | Carlson et al. |

FOREIGN PATENT DOCUMENTS

| | | |
|---|---|---|
| CN | 108639109 A | 10/2018 |
| CN | 108791363 A | 11/2018 |
| CN | 109367579 A | 2/2019 |
| CN | 110228506 A | 9/2019 |
| DE | 94 22 276 U1 | 11/1999 |
| DE | 10 2004 053 163 A1 | 6/2005 |
| DE | 10 2008 020 700 A1 | 11/2009 |
| EP | 0 433 768 A2 | 6/1991 |
| EP | 0 650 429 A1 | 5/1995 |
| EP | 1 308 366 A1 | 5/2003 |
| EP | 1 540 564 A1 | 6/2005 |
| EP | 1 708 810 A1 | 10/2006 |
| EP | 1 785 744 A1 | 5/2007 |
| EP | 1 861 303 A1 | 12/2007 |

(56) References Cited

FOREIGN PATENT DOCUMENTS

| | | |
|---|---|---|
| EP | 1 868 175 A2 | 12/2007 |
| EP | 2 079 066 A1 | 7/2009 |
| EP | 2 085 286 A2 | 8/2009 |
| EP | 2 571 742 A1 | 3/2013 |
| EP | 2 946 982 A1 | 11/2015 |
| JP | H02-179578 A | 7/1990 |
| JP | 2000-033875 A | 2/2000 |
| JP | 2001-106074 A | 4/2001 |
| JP | 2001-347946 A | 12/2001 |
| JP | 2006-213084 A | 8/2006 |
| JP | 2007-186162 A | 7/2007 |
| JP | 2009-225585 A | 10/2009 |
| JP | 2010-136083 A | 6/2010 |
| JP | 2012-210869 A | 11/2012 |
| KR | 10-2015-0143955 A | 12/2015 |
| RU | 2 467 902 C1 | 11/2012 |
| WO | WO 94/26571 A1 | 11/1994 |
| WO | WO 98/37432 A1 | 8/1998 |
| WO | WO 03/009254 A1 | 1/2003 |
| WO | WO 03/081514 A1 | 10/2003 |
| WO | WO 2005/072866 A1 | 8/2005 |
| WO | WO 2006/097788 A1 | 9/2006 |
| WO | WO 2006/136783 A1 | 12/2006 |
| WO | WO 2009/139927 A2 | 11/2009 |
| WO | WO 2010/012040 A1 | 2/2010 |
| WO | WO 2010/060795 A1 | 6/2010 |
| WO | WO 2010/060797 A1 | 6/2010 |
| WO | WO 2012/067730 A1 | 5/2012 |
| WO | WO 2012/074680 A1 | 6/2012 |
| WO | WO 2012/093249 A1 | 7/2012 |
| WO | WO 2012/133359 A1 | 10/2012 |
| WO | WO 2013/056244 A1 | 4/2013 |
| WO | WO 2013/140431 A1 | 9/2013 |
| WO | WO 2013/146429 A1 | 10/2013 |

OTHER PUBLICATIONS

International Preliminary Report on Patentability for International Application No. PCT/US2020/046173 mailed Feb. 24, 2022.
Crapart et al., 5G Positioning and Hybridization With GNSS Observations. ITSNT 2018, International Technical Symposium on Navigation and Timing Oct. 13, 2018. 8 pages.
Destino et al., Performance analysis of hybrid 5G-GNSS localization. 2018 52nd Asilomar Conference on Signals, Systems, and Computers Oct. 28, 2018:8-12.
Maymo-Camps et al., 5G positioning and hybridization with GNSS observations. Proceedings of the International Technical Symposium on Navigation and Timing (ITSNT), Toulouse, France Nov. 13, 2018. 7 pages.
Mueck et al., 5G Champion—Rolling out 5G in 2018. 2016 IEEE Globecom Workshops (GC Wkshps) Dec. 4, 2016. 6 pages.
Otegui et al., Evaluation of experimental GNSS and 10-DOF MEMS IMU measurements for train positioning. IEEE Transactions on Instrumentation and Measurement. Jan. 1, 2019;68(1):269-79.
Spinsante et al., Hybridized-GNSS approaches to train positioning: challenges and open issues on uncertainty. Sensors. Jan. 2020;20(7):1885. 17 pages.
Vantuono, Questions hang over CBTC testing following resignations from NYCT. International Railway Journal. Apr. 16, 2020. 8 pages. https://www.railjournal.com/in_depth/questions-cbtc-testing-resignations-nyct/ [Last accessed Apr. 15, 2022].
Wang et al., Adaptive threshold for zero-velocity detector in ZUPT-aided pedestrian inertial navigation. IEEE Sensors Letters. Oct. 7, 2019;3(11):1-4.
[No Author Listed], APS013 Application Note. Decawave. 2015. 15 pages.
[No Author Listed], Electromagnetic compatability and Radio spectrum Matters (ERM); Short Range Devices (SRD); UWB location tracking devices in the railroad environment. ETSI TR 101 538 Technical Report. Oct. 2012. 34 pages.
[No Author Listed], Intelligent Transportation based UWB Positioning and Connectivity. University at Albany—SUNY. 2017. 34 pages. https://www.albany.edu/sine/assets/docs/UAlbany%20UWB%20Study.pdf [Last accessed Aug. 10, 2022].
Fall et al., Assessment of the Contribution of Time Reversal on a UWB Localization System for Railway Applications. International Journal of Intelligent Transportation Systems Research. 2014;12.
Fall et al., Time-reversal UWB positioning beacon for railway application. Wireless Engineering and Technology. 2013;4:28-39.
Fall et al., Train accurate localization using ultra wide band radio and time reversal. International Journal of Engineering and Innovative Technology. Jan. 1, 2014;3(12):234-244.
Flaherty, CCS: A railway corridor control system utilizing ultra wideband radio technology. ASME/IEEE Joint Rail Conference. Apr. 6, 2004:201-4.
Grover, Wireless Sensor network in railway signalling system. 2015 Fifth International Conference on Communication Systems and Network Technologies Apr. 4, 2015:308-13.
Hui et al., UWB, Multi-sensors and Wifi-Mesh based precision positioning for urban rail traffic. 2010 Ubiquitous Positioning Indoor Navigation and Location Based Service.
Mahobe, UWB Radio Wireless Communication System Design for Railway Tunnels. Doctoral dissertation. Jun. 2013.
Saghir et al., Time-reversal UWB wireless communication-based train control in tunnel. Journal of communications. 2009;4.
Zhang et al., Development of an UWB indoor 3D positioning radar with millimeter accuracy. In2006 IEEE MTT-S International Microwave Symposium Digest Jun. 11, 2006:106-9.
International Search Report and Written Opinion for International Application No. PCT/US2020/046173 mailed Dec. 14, 2020.
Invitation to Pay Additional Fees for International Application No. PCT/US2020/046173 mailed Sep. 30, 2020.
International Search Report and Written Opinion for International Application No. PCT/US2020/059077 mailed Feb. 15, 2021.
File history for U.S. Pat. No. 10,179,595 retrieved Jan. 30, 2023. 190 pages.
File history for U.S. Pat. No. 10,737,709 retrieved Jan. 30, 2023. 219 pages.
File history for U.S. Appl. No. 62/177,683 retrieved Jan. 30, 2023. 11 pages.
Petition for Inter Partes Review for Case No. IPR2023-0460 dated Jan. 9, 2023.
Petition for Inter Partes Review for Case No. IPR2023-00439 dated Jan. 9, 2023.
Declaration of Harry Gigas signed Jun. 3, 2022. Exhibit 1013. 30 pages.
Declaration of Harry Gigas signed Jun. 3, 2022. Exhibit 1008. 30 pages.
Declaration of Michael Braasch for U.S. Pat. No. 10,179,595 signed Jan. 3, 2023. 179 pages.
Declaration of Michael Braasch for U.S. Pat. No. 10,737,709 signed Jan. 5, 2023. 176 pages.
[No Author Listed], IEEE Standards Association. IEEE Std 802.15.4™ 2011, IEEE standard for local and metropolitan area networks—part 15.4: Low-rate wireless personal area networks (LR-WPANs). Sep. 5, 2011. 314 pages.
Bennett et al., Time-domain electromagnetics and its applications. Proceedings of the IEEE. Mar. 1978;66(3):299-318.

* cited by examiner

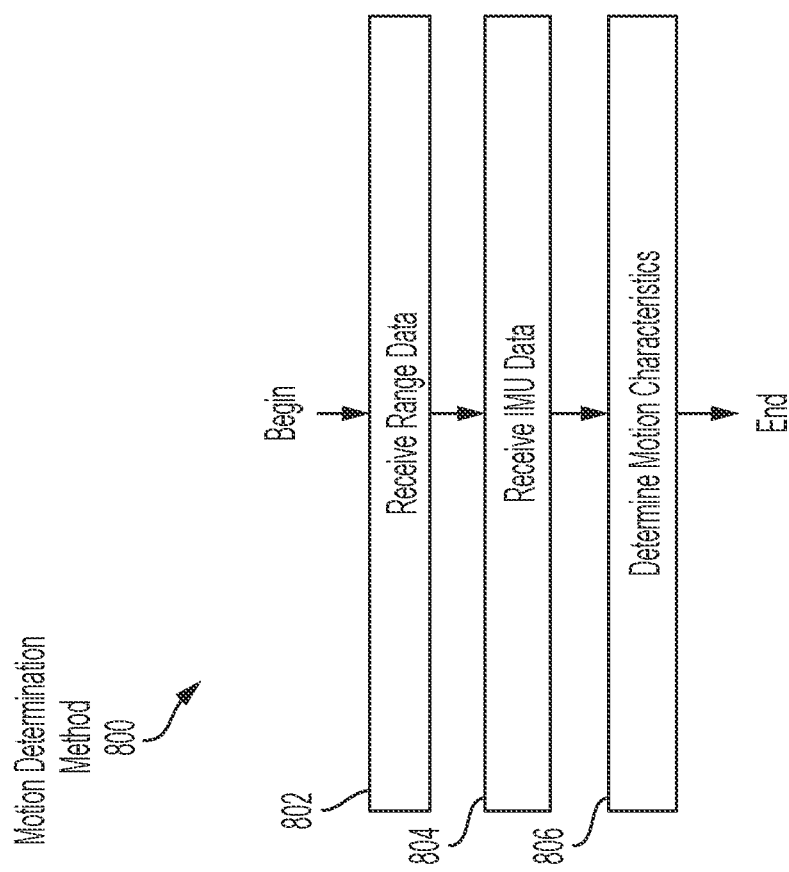

TECHNIQUES AND ASSOCIATED SYSTEMS AND METHODS FOR DETERMINING TRAIN MOTION CHARACTERISTICS

RELATED APPLICATIONS

This application claims priority under 35 U.S.C. § 119(e) to U.S. Provisional Application Ser. No. 62/931,481, filed Nov. 6, 2019, and titled, "TECHNIQUES AND ASSOCIATED SYSTEMS AND METHODS FOR DETERMINING TRAIN MOTION CHARACTERISTICS," which is incorporated by reference in its entirety herein.

BACKGROUND

Train systems, such as urban subway systems, employ train control mechanisms to facilitate the safe movement of trains about the various train tracks of the train system. To prevent collisions between trains moving along the same track, conventional train control systems monitor segments of the track to ensure that only a single train is traveling within any particular segment.

SUMMARY

Some embodiments of the technology described herein relate to a system for determining motion characteristics of a train traveling along a train track. The system may comprise at least one RF antenna configured to receive RF signals from at least one anchor node positioned proximate the train track, at least one inertial measurement unit (IMU) configured to generate IMU data responsive to motion of the train along the train track, and at least one processor configured to determine at least one distance between the at least one RF antenna and the at least one anchor node and determine one or more motion characteristics of the train using the at least one distance and the IMU data.

In some embodiments, the one or more motion characteristics may be selected from a group consisting of position, velocity, acceleration, position uncertainty, velocity uncertainty, and acceleration uncertainty. In some embodiments, the one or more motion characteristics may include velocity.

In some embodiments, the at least one processor may comprises a first processor communicatively coupled to the at least one RF antenna and configured to determine the at least one distance, and a second processor communicatively coupled to the first processor and the at least one IMU and configured to determine the one or more motion characteristics. In some embodiments, the system may further comprise at least one circuit board having the second processor thereon, and the first processor may be wired to the at least one circuit board. In some embodiments, the first processor may be packaged with the at least one antenna. In some embodiments, the at least one IMU may be disposed on the at least one circuit board. In some embodiments, the system may further comprise a memory disposed on the at least one circuit board, and the at least one processor may be configured to store the at least one distance in the memory.

In some embodiments, the at least one RF antenna may be configured to receive the RF signals having a center frequency between 3-10 GHz. In some embodiments, the at least one RF antenna may be configured to receive the RF signals having a bandwidth of at least 500 MHz. In some embodiments, the at least one RF antenna may be configured to receive the RF signals having a bandwidth of at least 2 GHz.

In some embodiments, the at least one IMU may include a plurality of IMUs.

In some embodiments, the at least one processor may be configured to determine the one or more motion characteristics using a graph-based optimization algorithm. In some embodiments, the at least one processor may be configured to determine the one or more motion characteristics using a Bayesian estimation algorithm. In some embodiments, the Bayesian estimation algorithm may include at least one member selected from a group consisting of a pose graph optimization, a factor graph optimization, a non-linear least squares optimization, an extended Kalman filter, an unscented Kalman filter, and a particle filter.

Some embodiments of the technology described herein relate to a method of determining motion characteristics of a train traveling along a train track. The method may comprise receiving, via at least one RF antenna, RF signals from at least one anchor node positioned proximate the train track, receiving, via at least one inertial measurement unit (IMU), IMU data generated responsive to motion of the train along the train track, and determining, by at least one processor, at least one distance between the at least one RF antenna and the at least one anchor node, and one or more motion characteristics of the train using the at least one distance and the IMU data.

In some embodiments, the one or more motion characteristics may be selected from a group consisting of: position, velocity, acceleration, position uncertainty, velocity uncertainty, and acceleration uncertainty. In some embodiments, the one or more motion characteristics may include velocity.

In some embodiments, determining the at least one distance may be performed by a first processor of the at least one processor, and determining the one or more motion characteristics may be performed by a second processor of the at least one processor.

In some embodiments, the RF signals may have a center frequency between 3-10 GHz. In some embodiments, the RF signals may have a bandwidth of at least 500 MHz. In some embodiments, the RF signals may have a bandwidth of at least 2 GHz.

In some embodiments, the at least one IMU may include a plurality of IMUs.

In some embodiments, the method may further comprise determining, by the at least one processor, the one or more motion characteristics using a graph-based optimization algorithm. In some embodiments, the method may further comprise determining, by the at least one processor, the one or more motion characteristics using a Bayesian estimation algorithm. In some embodiments, the Bayesian estimation algorithm may include at least one member selected from a group consisting of a pose graph optimization, a factor graph optimization, a non-linear least squares optimization, an extended Kalman filter, an unscented Kalman filter, and a particle filter.

Some embodiments of the technology described herein relate to a system for determining a velocity of a train traveling along a train track. The system may comprise at least one RF antenna configured to receive RF signals from at least one anchor node positioned proximate the train track and at least one processor configured to determine at least one distance between the at least one RF antenna and the at least one anchor node and determine the velocity of the train using the at least one distance.

In some embodiments, the at least one processor may be further configured to determine, using the at least one distance, an estimate of uncertainty for the determined velocity of the train. In some embodiments, the at least one processor may be further configured to determine a position and/or an acceleration of the train using the at least one distance.

In some embodiments, the at least one processor may comprise a first processor configured to determine the at least one distance and a second processor configured to determine the velocity of the train. In some embodiments, the system may further comprise at least one circuit board having the second processor thereon, and the first processor may be wired to the at least one circuit board. In some embodiments, the first processor may be packaged with the at least one antenna. In some embodiments, the system may further comprise a memory disposed on the at least one circuit board, and the at least one processor may be configured to store the at least one distance in the memory.

In some embodiments, the at least one RF antenna may be configured to receive the RF signals having a center frequency between 3-10 GHz. In some embodiments, the at least one RF antenna may be configured to receive the RF signals having a bandwidth of at least 500 MHz. In some embodiments, the at least one RF antenna may be configured to receive the RF signals having a bandwidth of at least 2 GHz.

In some embodiments, the at least one processor may be configured to determine the velocity using a graph-based optimization algorithm. In some embodiments, the at least one processor may be configured to determine the velocity using a Bayesian estimation algorithm. In some embodiments, the Bayesian estimation algorithm may include at least one member selected from a group consisting of a pose graph optimization, a factor graph optimization, a non-linear least squares optimization, an extended Kalman filter, an unscented Kalman filter, and a particle filter.

Some embodiments of the technology described herein relate to a method of determining a velocity of a train traveling along a train track. The method may comprise receiving, via at least one RF antenna, RF signals from at least one anchor node positioned proximate the train track, and determining, by at least one processor, at least one distance between the at least one RF antenna and the at least one anchor node, and the velocity of the train using the at least one distance.

In some embodiments, determining the at least one distance may be performed by a first processor of the at least one processor, and determining the velocity may be performed by a second processor of the at least one processor. n some embodiments, the method may further include determining, by the at least one processor, a position and/or acceleration of the train using the at least one distance.

In some embodiments, the RF signals may have a center frequency between 3-10 GHz. In some embodiments, the RF signals may have a bandwidth of at least 500 MHz. In some embodiments, the RF signals may have a bandwidth of at least 2 GHz.

In some embodiments, the method may further comprise determining, by the at least one processor, the velocity using a graph-based optimization algorithm. In some embodiments, the method may further comprise determining, by the at least one processor, the velocity using a Bayesian estimation algorithm. In some embodiments, the Bayesian estimation algorithm may include at least one member selected from a group consisting of a pose graph optimization, a factor graph optimization, a non-linear least squares optimization, an extended Kalman filter, an unscented Kalman filter, and a particle filter.

Some embodiments of the technology described herein relate to a system for determining a velocity of a train traveling along a train track. The system may comprise at least one inertial measurement unit (IMU) configured to generate IMU data responsive to motion of the train along the train track and at least one processor configured to determine velocity of the train using the IMU data.

In some embodiments, the at least one processor may be further configured to determine, using the IMU data, an estimate of uncertainty for the determined velocity of the train. In some embodiments, the at least one processor may be further configured to determine, using the IMU data, a position, an acceleration, and/or an orientation of the train.

In some embodiments, the system may further comprise at least one circuit board having the at least one processor thereon. In some embodiments, the at least one IMU may be disposed on the at least one circuit board. In some embodiments, the system may further comprise a memory disposed on the at least one circuit board, and the at least one processor may be configured to store the IMU data in the memory. In some embodiments, the at least one IMU may include a plurality of IMUs.

In some embodiments, the at least one processor may be configured to determine the velocity using a graph-based optimization algorithm. In some embodiments, the at least one processor may be configured to determine the velocity using a Bayesian estimation algorithm. In some embodiments, the Bayesian estimation algorithm may include at least one member selected from a group consisting of a pose graph optimization, a factor graph optimization, a non-linear least squares optimization, an extended Kalman filter, an unscented Kalman filter, and a particle filter.

Some embodiments of the technology described herein relate to a method of determining a velocity of a train traveling along a train track. The method may comprise receiving, via at least one inertial measurement unit (IMU), IMU data generated responsive to motion of the train along the train track, and determining, by at least one processor, a velocity of the train using the IMU data.

In some embodiments, the at least one IMU may include a plurality of IMUs.

In some embodiments, the method may further comprise determining, by the at least one processor, a position, an acceleration, and/or an orientation of the train using the IMU data.

In some embodiments, the method may further comprise determining, by the at least one processor, the velocity using a graph-based optimization algorithm. In some embodiments, the method may further comprise determining, by the at least one processor, the velocity using a Bayesian estimation algorithm. In some embodiments, the Bayesian estimation algorithm may include at least one member selected from a group consisting of a pose graph optimization, a factor graph optimization, a non-linear least squares optimization, an extended Kalman filter, an unscented Kalman filter, and a particle filter.

BRIEF DESCRIPTION OF DRAWINGS

Various aspects and embodiments of the disclosed technology will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIG. 8 is a drawing of an illustrative method 800 for determining motion characteristics of a train traveling along a train track, in accordance with some embodiments of the technology described herein.

DETAILED DESCRIPTION

Figure 1:
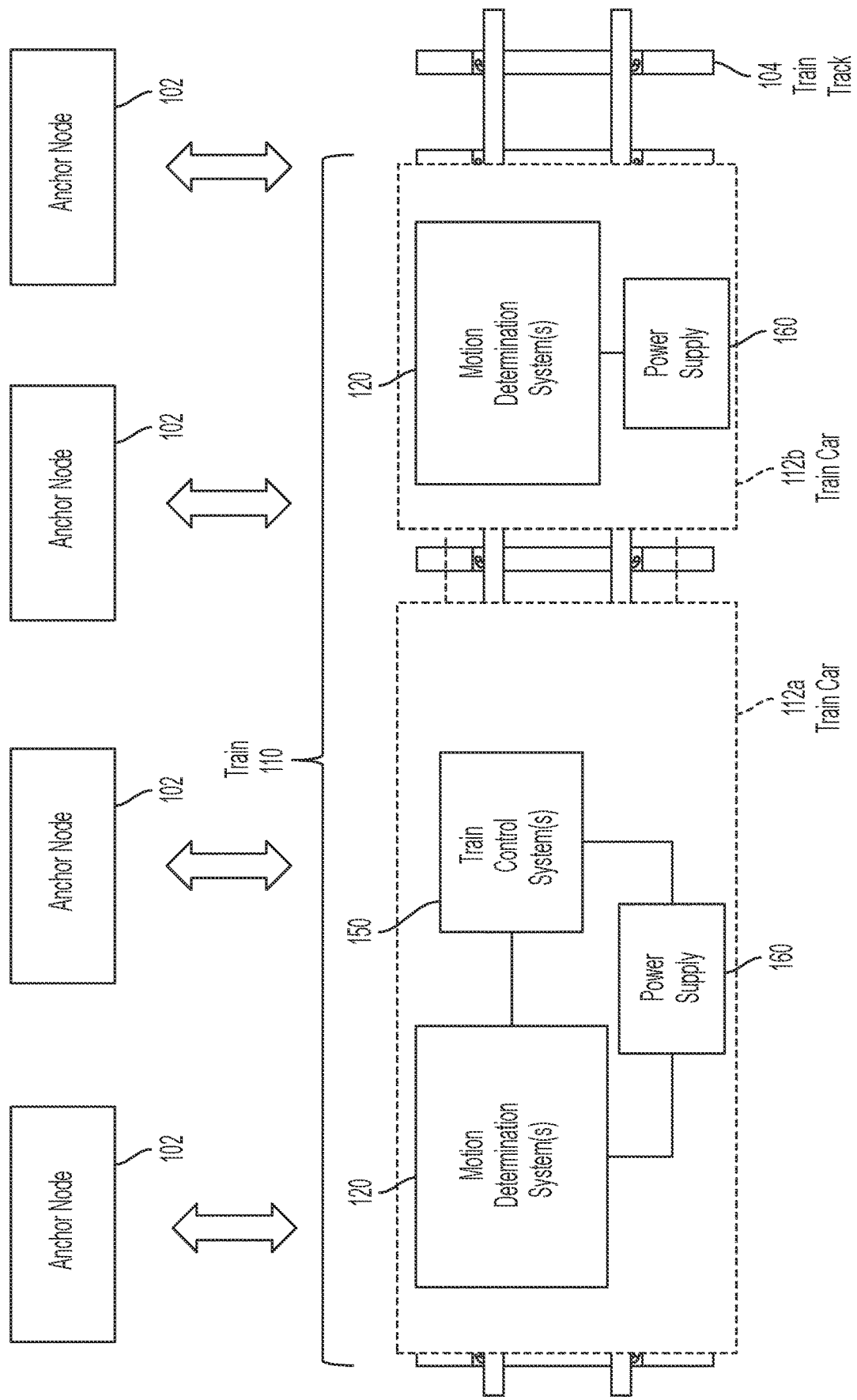
FIG. 1 is a drawing of an illustrative train 110 traveling along a train track 104 and incorporating a system 120 for determining motion characteristics of the train 110, in accordance with some embodiments of the technology described herein.

The inventors recognized that conventional train control systems constrain the capacity of a train system (e.g., rate at which passengers are transported by the train system) because the conventional train control systems are unable to precisely locate trains within the train system. For instance, conventional train control systems permit only one train to travel in a given track segment because the train control systems are not able to precisely locate trains within the track segment, and thus could not prevent a collision between two trains traveling along the same track segment. For example, if two trains were traveling in the same track segment and the leading train stopped, the train control system would be unable to detect the stopping of the leading train and appropriately signal the following train to stop before colliding with the leading train. Additionally, because the train control system may need to stop a train before the train reaches the next track segment, trains within the train system are operated at low speed. For example, if two trains were traveling in consecutive track segments and the leading train stopped while traveling in its track segment, the following train would have to stop before reaching the next track segment because the train control system does not know where the leading train is within the next track segment. Accordingly, the lack of precision in locating trains along the tracks prevents more trains from traveling in the same track segment, and also limits the speed at which trains may safely travel along the tracks.

To address these drawbacks of conventional train control systems, the inventors developed techniques for determining motion characteristics (e.g., position, velocity, acceleration, position uncertainty, velocity uncertainty, acceleration uncertainty, etc.) of trains traveling along a train track with greater accuracy than previously possible. These techniques may be used to safely operate the trains at higher speeds and with shorter separation between trains than previously possible, thereby allowing for an increased capacity of the train system. In some embodiments, the techniques developed by the inventors use ultra-wideband (UWB) RF data and/or inertial measurement unit (IMU) data collected by one or more IMUs onboard a train to determine the train's motion characteristics as the train travels along the train track. The inventors recognized that determining the train's motion characteristics using such techniques provides train control systems with enhanced precision, enabling trains to travel faster and closer together along a train track without compromising safety.

Some techniques developed by the inventors facilitate determining motion characteristics using range data obtained via one or more wireless links between electronics onboard the train and electronics positioned along the train track. In some embodiments, the range data may indicate the position, velocity, and/or acceleration of the train. In one example, the train may include one or more radio frequency antennas (e.g., ultra-wideband antennas) onboard the train that exchange wireless signals with one or more anchor nodes positioned along the train track. In some embodiments, radio frequency antennas described herein may be configured to receive signals having a center frequency between 3-10 GHz, such as between 3-5 GHz, between 4-5 GHz, and/or between 7-10 GHz. In some embodiments, radio frequency antennas may have a bandwidth of at least 500 MHz, at least 1 GHz, and/or at least 2 GHz. In the above example, the range data may include a distance separating the train from the anchor node(s), and one or more processors located onboard the train may be configured to determine the motion characteristics using the range data. In some embodiments, one or more range processors (e.g., of multiple processors onboard the train) may be packaged with the antenna(s) to determine the range data, and another processor may be disposed on a circuit board that is wired to the antenna(s) for determining the motion characteristics using the range data.

Some techniques described herein alternatively or additionally use one or more inertial measurement units (IMUs) onboard the train, which generate motion data responsive to detecting movement of the train (e.g., along the track, away from or towards the track, etc.), to determine the motion characteristics of the train. For instance, the motion data generated by the IMU(s) may indicate a position, velocity, and/or acceleration of the train. In one example, one or more processors onboard the train may be configured to determine the motion characteristics using the motion data from the IMU(s). In some embodiments, the processor(s) may be disposed on a circuit board, and the IMU(s) may be disposed on the same circuit board.

Some techniques described herein provide an estimated uncertainty to accompany motion characteristics determined using the antenna(s) and/or the IMU(s) described herein. For instance, in some embodiments, the processor(s) onboard the train may be configured to determine an uncertainty of motion characteristics generated using the antenna(s), taking into account factors such as how recently the range data was determined, how strong the transmitted and/or received wireless signals were, whether range data determined using other antennas onboard the train is substantially different from the range data used to determine the motion characteristics, and other such considerations. Alternatively or additionally, in some embodiments, the processor(s) may be configured to determine an uncertainty of motion characteristics generated using the IMU(s), taking into account factors such as how recently the IMU data was generated, whether data from any other IMUs onboard the train is substantially different from the IMU data used to determine the motion characteristics.

Some techniques described herein use data from multiple modalities (e.g., antenna(s) and IMU(s), etc.) to determine motion characteristics of a train. In some embodiments, the train may have one or more radio frequency antennas onboard for exchanging signals with one or more track-adjacent anchor nodes to generate range data, and the train may also have one or more IMUs onboard to generate motion data responsive to detecting movement of the train. The inventors recognized that using only one modality (e.g., only antenna(s) or only IMU(s)) may cause the motion characteristics determined onboard the train to have an intolerable level of uncertainty for some applications. For instance, in such applications, error in the motion characteristics caused by a temporary failure of one of the modalities (e.g., poor antenna signal due to weather, etc.) may compromise the safety of trains within the systems. Accordingly, multi-modal techniques (e.g., using the antenna(s) and the IMU(s)) may compensate for uncertainty resulting from a failure of one of the modalities, as the other modality may detect the failure and/or provide the data needed to determine motion characteristics in the absence of the failed modality. For example, range data determined using the antenna(s) may be inconsistent with IMU data, thus indicating a failure of the antenna and/or an anchor node in communication with the antenna. The antenna failure may be mitigated by using the IMU data, and not using the range data, to determine the motion characteristics of the train.

The inventors further developed techniques for reconciling data received from multiple modalities (e.g., antenna(s) and IMU(s), etc.) to mitigate uncertainty in the data. For instance, in some embodiments, the processor(s) onboard the train may be configured to correct data from the IMU(s) using range data from the antenna(s). In one example, the processor(s) may be configured to store previously determined motion characteristics (e.g., position, velocity, and acceleration) in a memory and estimate motion characteristics at a later time using data from the IMU(s). Then, the processor(s) may be configured to determine motion characteristics using range data from the antenna(s) to correct the motion characteristics that were estimated using the IMU(s). In this example, the IMU(s) may be configured to determine the acceleration of the train using measurements of acceleration in the direction of the train track and also in a gravity direction, such that the uphill or downhill slope of the track may be incorporated into estimating the position and/or velocity of the train. The range data received from the antenna(s) may be used to correct the position and/or velocity estimates made using the acceleration measurements determined using the IMU(s). As a result, motion characteristics determined onboard the train may be more accurate by intelligently combining data from the multiple modalities to compensate for one another, increasing the confidence with which train control systems may operate the trains.

Some techniques described herein further provide an interface between the electronics onboard the train tasked with determining the motion characteristics and the train control system. For instance, in some embodiments, the interface may provide the motion characteristics to an onboard control system satellite that forwards the communications to a central hub and receives operation commands from the central hub in response. Alternatively or additionally, in some embodiments, the interface may provide the motion characteristics to a decentralized control system hub that generates operation commands for the train from onboard. Accordingly, motion determination systems described herein provide the motion characteristics directly to the train control system.

It should be appreciated that various aspects described herein may be implemented in any of numerous ways. Examples of specific implementations are provided herein for illustrative purposes only. In addition, the various aspects described in the embodiments below may be used alone or in any combination and are not limited to the combinations described explicitly herein.

FIG. 1 is a drawing of an illustrative train 110 traveling along a train track 104 and incorporating a system 120 for determining motion characteristics of the train 110, in accordance with some embodiments of the technology described herein. In FIG. 1, the train 110 includes multiple train cars 112a and 112b, each including at least one motion determination system 120 and a power supply 160. The motion determination system(s) 120 may be configured to determine a position, velocity, and/or acceleration of the train 110. Train car 112a also includes at least one train control system 150 that may be configured to determine when the train 110 moves and stops, and/or the speed for the train 110 to travel, depending on motion characteristics provided by the motion determination system(s) 120.

FIG. 1 further illustrates anchor nodes 102 positioned along the train track 104 and operating in communication with the motion determination system(s) 120 onboard the train 110 to facilitate determination of motion characteristics of the train 110, as described further herein. While the anchor nodes 102 are illustrated side-by-side with the track 104, it should be appreciated that anchor nodes 102 described herein alternatively or additionally may be positioned above or below the train track 104, or in any other position suitable for exchanging wireless signals with antennas onboard the train 110. In some embodiments, the anchor nodes 102 may have known positions. For example, the positions of the anchor nodes 102 may be surveyed and recorded (e.g., stored in memory of a central database and/or a memory of motion determination system 120) during and/or after installation of the anchor nodes 102.

In some embodiments, anchor nodes 102 may be spaced from each other along the direction of elongation of the train track 104. For example, an average spacing between adjacent anchor nodes 102 may be less than 1 kilometer (km), such as 600 meters (m). In this example, anchor nodes 102 may be capable of transmitting and/or receiving RF signals over a transmission range of at least 100 m, such as 300 m and/or 350 m. In some embodiments, where the train track 104 bends, an anchor node 102 may be positioned on the outer side (e.g., the longer side) of the bend.

In some embodiments, motion determination system(s) 120 may be positioned onboard the train cars 112a and 112b. For example, motion determination system(s) 120 may be positioned in portions of the train cars 112a and 112b that do not house the train crew, passengers, or cargo, such as in an area above the cabin of the train car. Alternatively or additionally, in some embodiments, motion determination system(s) 120 may be positioned in the cabins of the train car 112a and/or 112b. In some embodiments, train control system(s) 150 may be positioned in the same portion of the train car 112a as motion determination system(s) 120. In some embodiments, train control system(s) 150 may be positioned in a different portion of the train car 112a from motion determination system(s) 120.

Each motion determination system 120 onboard the train 110 may be configured to determine motion characteristics of the train 110 traveling along the train track 104 using data gathered from one or more sensors on the train 110. For example, the motion determination system(s) 120 may include one or more radio frequency (RF) antennas and/or IMUs, and one or more processors to determine the motion characteristics using data from the antenna(s) and/or IMU(s). In some embodiments, data from only one modality (e.g., the RF antenna(s), the IMU(s), etc.) may be incorporated in determining the motion characteristics. In other embodiments, data from multiple modalities may be incorporated, as described further herein.

For motion determination systems 120 that include the RF antenna(s), the antenna(s) may exchange wireless signals with the track-adjacent anchor node(s) 120 to generate range data indicating the position, velocity, and/or acceleration of the train 110. The processor(s) onboard the train 110 (e.g., including one or more range processors) may be configured to determine the range data using the exchanged wireless signals, such as using time of flight measurements that indicate the distance separating the RF antenna(s) from the anchor node(s) 102. In some embodiments, the range data may include a distance from the train 110 to the anchor node(s) 102. For example, the RF antenna(s) of the motion determination system 120 may transmit a first signal to an anchor node 102 and the anchor node 102 may transmit a second signal 102 to the motion determination system 120 in response to receiving the first signal. In this example, the round-trip travel time between transmitting the first signal and receiving the second signal may indicate the distance between the RF antenna(s) of the motion determination system 120 and the anchor node 102. The distance may be determined by subtracting from the round-trip travel time any known delays, such as a delay between when the anchor node 102 receives the first signal and transmits the second signal, dividing the round-trip travel time by two to obtain the one-way travel time, and multiplying the one-way travel time by the wave speed of the first and second signals (e.g., the speed of light in air).

In some embodiments, the distance between the anchor node 102 and the RF antenna(s) of the motion determination system 120 may be used to determine motion characteristics of the train 110. For example, if the anchor nodes 102 have known positions, a position of the train 110 may be determined using the determined distances between the train 110 and the anchor nodes 102 and the known positions of the anchor nodes 102. Alternatively or additionally, motion characteristics other than position, such as velocity and/or acceleration, may be determined using the distance and the known positions. In some embodiments, the RF antenna(s) onboard the train 110 may exchange wireless signals with multiple ones of the anchor nodes 102 to generate the range data. Alternatively or additionally, the processor(s) may generate multiple sets of range data corresponding to signals exchanged with the multiple anchor nodes 102 and/or using multiple RF antennas.

For motion determination systems 120 that include one or more IMUs, the IMU(s) may generate motion data responsive to detecting motion of the train 110 and provide the motion data to the processor(s) of the system(s) 120. For instance, the IMU(s) may be configured to determine one or more positions, velocities, and/or accelerations of the train 110 in the direction of the train track 104 and/or vertically with respect to the train track 104 (e.g., upwards away from the train track 104 or downwards towards the train track 104). In some embodiments, an IMU may include a gyroscope and/or accelerometer configured to provide signals indicative of acceleration of the train 110 along one or more directions. For example, motion data output by the IMU may be indicative of roll (e.g., rotational about an axis parallel to the direction of elongation of the train 110), pitch (e.g., rotational about an axis parallel to the ground surface and perpendicular to the direction of elongation of the train 110), and/or yaw (e.g., rotational about an axis perpendicular to the ground surface and the direction of elongation of the train 110) acceleration. In some embodiments, the processor(s) may be configured to determine the motion characteristics of the train 110 by accumulating motion data output by the IMU(s) over time. For example, given a position and/or velocity of the train 110 at a first time, the processor(s) may be configured to determine a later position and/or velocity of the train 110 using the position and/or velocity of the first time and the motion data generated by the IMU(s). In some embodiments, the processor(s) may be configured to determine that the train 110 is not moving in response to data from the IMU(s) indicating the train has zero acceleration.

In some embodiments, a motion determination system 120 may include the RF antenna(s) and the IMU(s), and the processor(s) of the system may be configured to determine the motion characteristics of the train 110 using the range data from the RF antenna(s) and the motion data from the IMU(s). For example, the processor(s) may estimate motion characteristics of the train 110 using the motion data from the IMU(s), such as by estimating a position of the train 110 using a previous position of the train 110 and one or more acceleration measurements (e.g., in multiple directions). In this example, the processor(s) may correct the motion characteristic estimates using range data received using the RF antenna(s), thus reducing the uncertainty of motion characteristics provided from the motion determination system 120 to the train control system(s) 150.

Motion determination systems 120 on the same or different train cars (e.g., 112a and 112b) may further communicate motion characteristics to one another via wired and/or wireless connections within and/or among the train cars. One or more of the motion determination systems 120 may interface directly with the train control system(s) 150 to provide the motion characteristics to the train control system(s) 150, such that the train control systems 150 are able to determine whether to start, stop, or continue movement of the train 110. For instance, motion characteristics received from multiple trains may indicate that one of the trains is at risk of colliding with another one of the trains. It should be appreciated that, in some embodiments, the train control system(s) 150 may send the motion characteristics to a central control location external to the train and receive motion control instructions in response to sending the transmitted motion characteristics.

Figure 2:
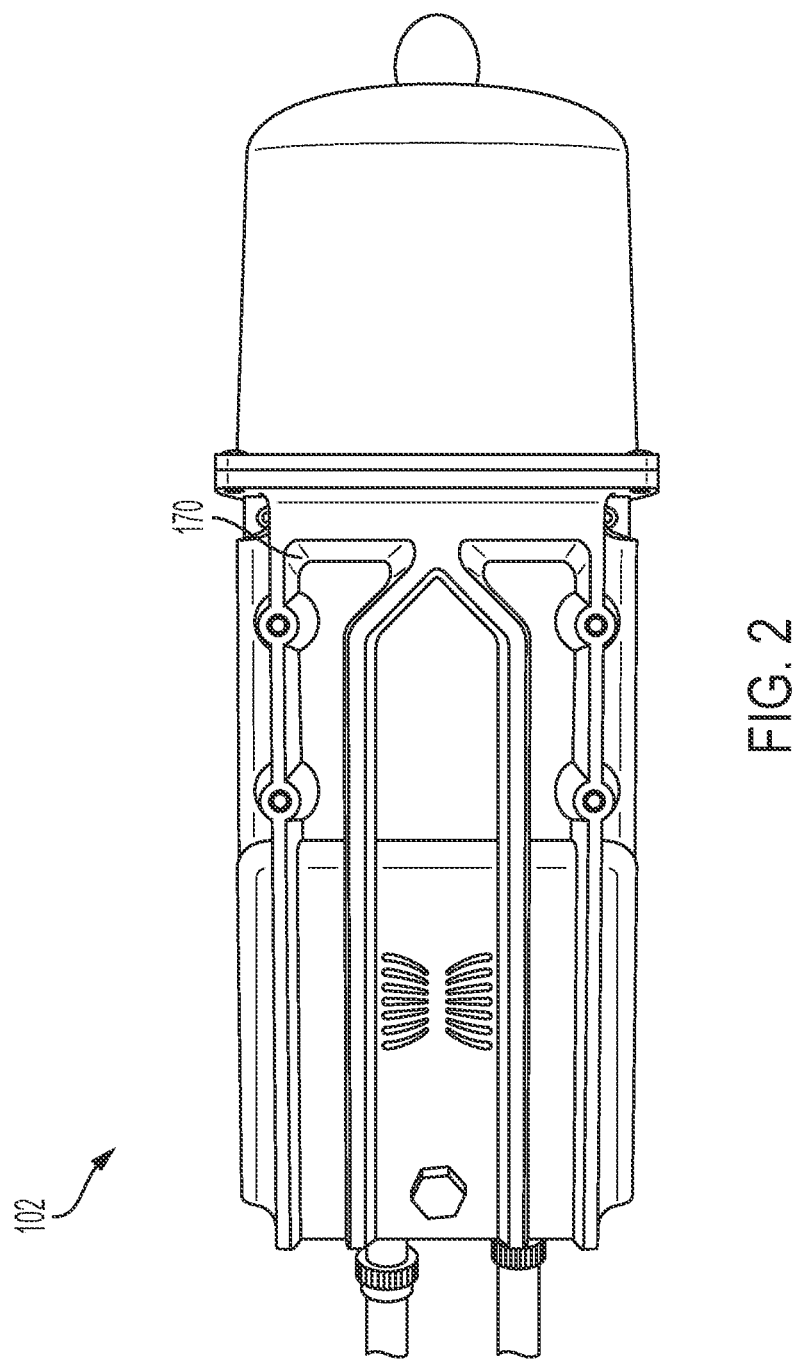
FIG. 2 is a drawing of an illustrative anchor node 102 that may be positioned along a train track, in accordance with some embodiments of the technology described herein.

FIG. 2 is a drawing of an illustrative anchor node 102 that may be positioned along a train track, in accordance with some embodiments of the technology described herein. In some embodiments, anchor node 102 may be mounted on a pole or a wall. For example, anchor node 102 may be placed on a pole or wall adjacent a train track. As shown in FIG. 2, anchor node 102 has a housing 170 containing other components of anchor node 102 (not shown). Such components may include one or more RF subsystems and one or more processors. For example, the RF subsystem(s) may be configured to transmit and/or receive RF signals to and/or from a motion determination system onboard a train for use by the motion determination system in determining motion characteristics of the train, as described herein. In some embodiments, housing 170 may be waterproof and/or dustproof to provide environmental protection for the components of anchor node 102. In some embodiments, anchor node 102 may be positioned outdoors. In some embodiments anchor node 102 may be positioned in a subway tunnel.

In some embodiments, multiple anchor nodes 102 may have a same position along a train track, such as along the direction of elongation of the train track and/or along a direction parallel to the ground below the train track and perpendicular to the direction of elongation of the train track. The inventors recognized that including multiple anchor nodes 102 having a same position (e.g., in a redundant configuration) allows for distance determination between a train and the anchor nodes 102 in the event one of the anchor nodes 102 fails during operation.

Figure 3:
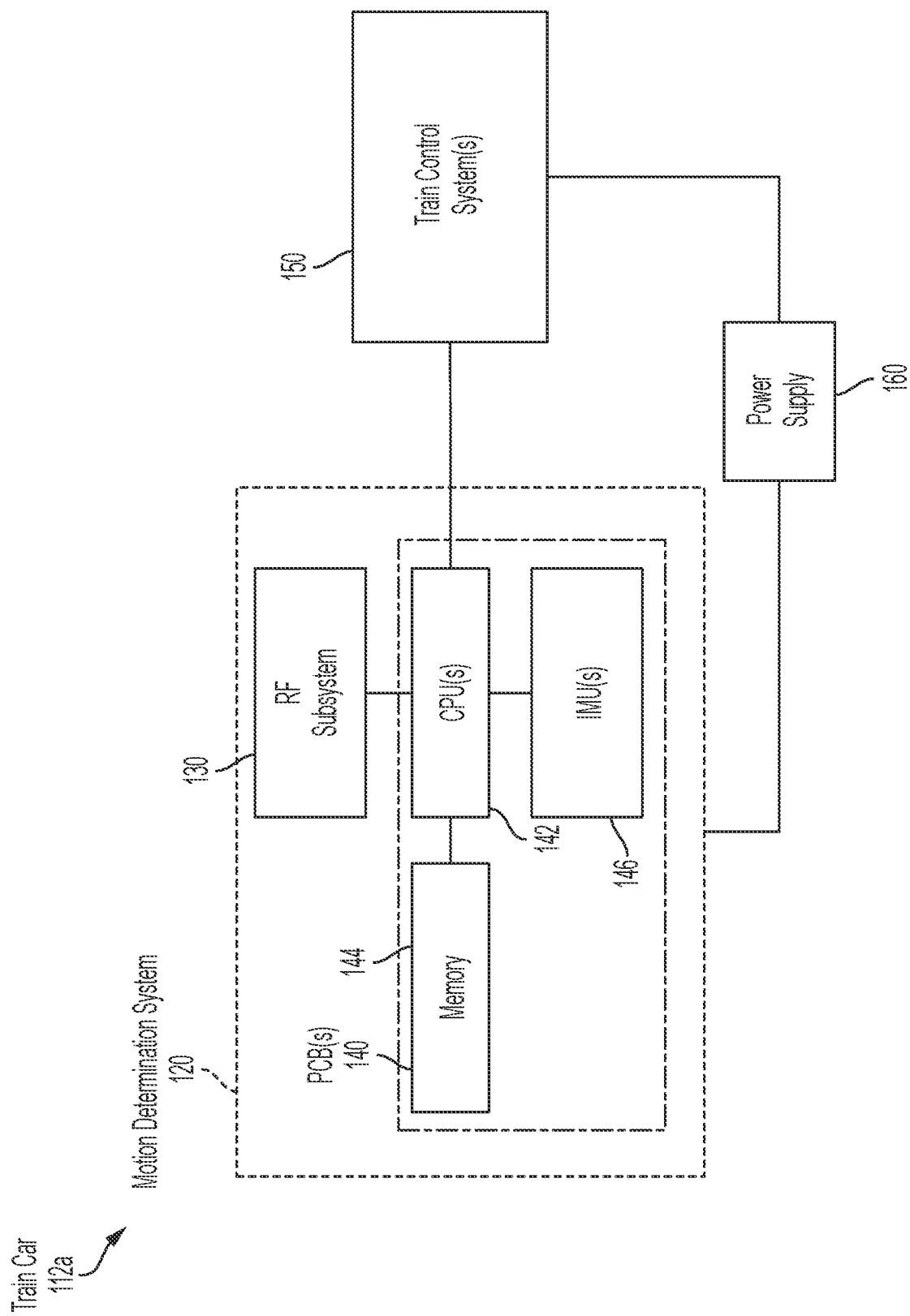
FIG. 3 is a drawing of an illustrative system 120 for determining motion characteristics of the train 110 and a train control system 150, each positioned onboard the train car 112a of FIG. 1, in accordance with some embodiments of the technology described herein.

FIG. 3 is a drawing of illustrative motion determination and train control systems 130 and 150 onboard the train car 112a of FIG. 1, in accordance with some embodiments of the technology described herein. In FIG. 3, the motion determination system 120 includes multiple motion determination modalities, namely an RF subsystem 130 including one or more radio frequency (RF) antennas, and one or more IMUs 146. The motion determination system further includes one or more processors 142 and a memory 144. It should be appreciated that, in accordance with various embodiments, motion determination systems described herein may include only one motion determination modality, such as the RF antenna(s) or the IMU(s), but not both.

As illustrated in FIG. 3, the processor(s) 142, IMU(s) 146, and memory 146 are disposed on one or more PCBs 140 coupled to RF subsystem 130. For instance, RF antenna(s) of RF subsystem 130 may provide range data to the processor(s) 142 for determining the motion characteristics. It should be appreciated that the components disposed on PCB(s) 140 may vary in accordance with various embodiments. For instance, in some embodiments, the IMU(s) 146 is/are not disposed on PCB(s) 140. Alternatively or additionally, the system 120 may include multiple PCBs 140 with components positioned on the multiple PCBs 140. As an example, the IMU(s) 146 may be positioned on respective PCBs 140. Further, in some embodiments, the RF antenna(s) of RF subsystem 130 may be disposed on one or more of PCBs 140.

In some embodiments, motion determination system 120 may be configured to determine motion characteristics of a train 110 using signals transmitted and/or received using RF subsystem 130. For example, one or more range processors of RF subsystem 130 may be configured to determine a distance between the RF antenna(s) of RF subsystem 130 and one or more anchor nodes 102, as described further herein including with reference to FIG. 4. In some embodiments, RF subsystem 130 may provide the distance(s) to processor(s) 142, and processor(s) 142 may be configured to determine motion characteristics using the distance(s). For example, if known positions of the anchor nodes 102 are stored in memory 140, processor(s) 142 may be configured to determine the position of train 110 using the known position of an anchor node 102 and the distance between the RF antenna(s) of RF subsystem 130 and the anchor node 102 (e.g., taking into account a known position of the RF antenna(s) onboard train 110).

In some embodiments, processor(s) 142 may be configured to determine a velocity of train 110 using a previous position of train 110 (e.g., stored in memory 144), the current position of train 110, and a travel time of train 110 between the positions. In some embodiments, processor(s) 142 may be configured to determine an acceleration of train 110 using the current velocity of train 110, a previous velocity of train 110 (e.g., stored in memory 144), and a travel time of train 110 between the velocities. In some embodiments, motion determination system 120 may be configured to determine motion characteristics of a train using the IMU(s) 146. For example, the IMU(s) 146 may output to processor(s) 142 one or more signals indicative of roll, pitch, and/or yaw acceleration of the train 110. In this example, a previous position, velocity, and/or acceleration of the train 110 may be stored in memory 144. A current velocity of the train 110 (e.g., along the train track and/or away from the train track) may be determined using a previous velocity of the train 110, the current acceleration of the train 110 (e.g., along a direction of the train track), and a travel time of train 110 between the previous velocity and the current acceleration. A current position and/or pitch of the train 110 may be determined using a previous position of the train 110, the current velocity of the train 110, and the travel time of train 110 between the positions.

In some embodiments, an analog-to-digital converter (ADC) may be included in IMU(s) 146 and/or coupled between IMU(s) 146 and processor(s) 142 to digitize signals from IMU(s) 146 before the signals are provided to processor(s) 142. In some embodiments, processor(s) 142 may store IMU signals and/or data derived from the IMU signals in memory 144, for example, in association with a time at which the IMU signals were received and/or generated. In some embodiments, signals output from IMU(s) 146 may indicate that the train has zero acceleration, and processor(s) 142 may be configured to determine using these signals that the train is not moving (e.g., in combination with previous signals indicating deceleration).

In some embodiments, motion determination system 120 may be configured to determine motion characteristics of a train using a combination of signals transmitted and/or received using RF subsystem 130 and IMU(s) 146. For example, processor(s) 142 may receive from RF subsystem 130 one or more distances between the RF antenna(s) of RF subsystem 130 and one or more respective anchor nodes 102, and one or more signals indicative of roll, pitch, and/or yaw acceleration from IMU(s) 146. In some embodiments, processor(s) 142 may be configured to determine a first set of motion characteristics (e.g., position, velocity, and acceleration) of the train 110 using the distance(s) provided by RF subsystem 130 and a second set of motion characteristics of the train 110 using the signal(s) provided by IMU(s) 146. For example, the two sets of motion characteristics may be different. Because IMU(s) 146 may be prone to drift over time, processor(s) 146 may override the second set of motion characteristics with the first set of motion characteristics. For example, when a position determined using RF signals conflicts with a position determined using IMU data, the position determined using RF signals may be selected as the determined position of the train 110.

In some embodiments, processor(s) 146 may be configured to reconcile motion characteristics determined using RF signals received by RF subsystem 130 with motion characteristics determined using signals from IMU(s) 146. In some embodiments, processor(s) 146 may adjust motion determination characteristics of IMU(s) 146 if motion characteristics determined using RF signals conflict with motion characteristics determined using IMU(s) 146. As used herein, motion determination characteristics are parameters that may factor into determining motion characteristics using RF signals and/or IMU data, such as estimated IMU accelerometer and/or gyroscope biases. For example, gyroscope and/or accelerometer biases over time may be stored in memory 144 and used to determine motion characteristics from the signal(s) generated by IMU(s) 146. In this example, processor(s) 142 may be configured to update the motion determination characteristics stored in memory 144 based on differences between the determined sets of motion characteristics. In some embodiments, processor(s) 142 may be configured to determine new gyroscope and/or accelerometer biases that reduce and/or minimize residuals between motion characteristics determined using RF signals and corresponding motion characteristics determined using IMU(s) 146. For example, the new gyroscope and/or accelerometer biases, when applied to the signal(s) received from IMU(s) 146, may reduce and/or minimize discrepancies between positions, velocities, and accelerations determined using RF signals and positions, velocities, and accelerations determined using IMU(s) 146.

In some embodiments, motion determination system 120 may include multiple IMUs 146 and/or RF subsystems 130. The inventors recognized that some IMUs 146 and/or RF subsystems 130 may fail during operation of motion determination system 120, and including multiple IMUs 146 and/or RF subsystems 130 configured redundantly reduces the susceptibility of motion determination system 120 to overall failure. For instance, if an IMU 146 and/or an RF subsystem 130 fails, the failure may be detected as a result of inconsistent data determined using the IMUs 146 and/or the RF subsystems 130. Upon determining the failure of an IMU 146 and/or RF subsystem 130, the motion determination system 120 may ignore data from the failed IMU 146 and/or RF subsystem 130.

Figure 4:
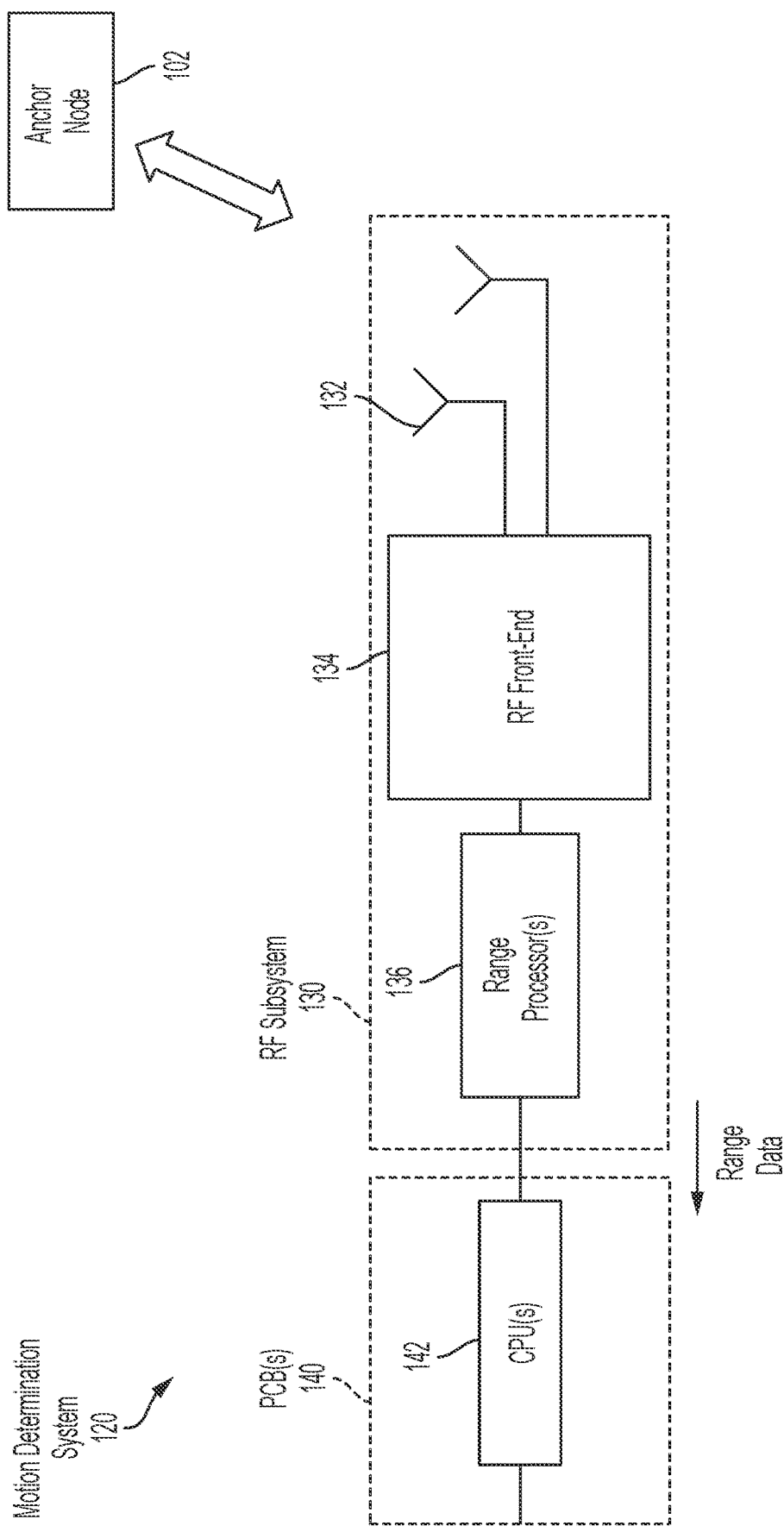
FIG. 4 is a drawing of illustrative components of a system 120 for determining motion characteristics of a train traveling along a train track, in accordance with some embodiments of the technology described herein.

FIG. 4 is a drawing of illustrative components of a system 120 for determining motion characteristics of a train traveling along a train track, in accordance with some embodiments of the technology described herein. In FIG. 4, RF subsystem 130 includes one or more range processors 136 coupled to multiple RF antennas 132 via an RF front-end 134. In some embodiments, RF antennas 132 may be configured transmit RF signals to and/or receive RF signals from one or more anchor nodes 102. In some embodiments, RF front-end 134 may be configured to prepare baseband signals for transmission by RF antennas 132 and/or prepare RF signals received by RF antennas 132 for processing by range processor(s) 136. In some embodiments, range processor(s) 136 may be configured to determine a distance between RF antennas 132 and an anchor node 102 using signals exchanged between the RF antenna(s) 132 and the anchor nodes 102.

In some embodiments, RF antennas 132 may be positioned in a part of a train car that facilitates communication with anchor nodes positioned adjacent the train track. For instance, RF antennas 132 may be positioned on an external face of the train car, and/or near an interior wall of the train car that is not shielded with metal or other electrical conductors.

In accordance with various embodiments, RF antennas 132 may include ultra-wideband (UWB) antennas. For example, RF antenna(s) 132 may be configured to receive signals having a center frequency on the order of 3-10 GHz, such as between 3-5 GHz, between 3-5 GHz, between 4-5 GHz and/or between 7-10 GHz. RF antenna(s) 132 may have a bandwidth of at least 500 MHz, such as at least 1 GHz and/or at least 2 GHz. In one example, RF antennas 132 may be configured to transmit and/or receive over a frequency range from 3.1-4.8 GHz. RF antennas 132 may be configured to communicate with anchor nodes 102 that are configured for the same or an overlapping frequency range. In one example, RF antennas 132 may have a gain of approximately 6 dB, whereas antennas of anchor nodes 102 may be substantially omnidirectional (e.g., having a gain of approximately 0 dB). In one example, an anchor node 102 may include one or more antennas coupled to circuitry configured to responsively transmit signals after receiving one or more signals from RF antennas 132 of the system 120 at a same or different frequency. It should be appreciated that RF antennas 132 may be configured to operate in any suitable frequency range and with any suitable gain level. While RF antennas 132 are shown including two antennas in FIG. 4, in some embodiments, RF antennas 132 may include greater or fewer than two antennas.

In some embodiments, RF front-end 134 may include circuitry for modulating, up-converting, and amplifying signals transmitted to the anchor node(s) via RF antennas 132, and/or amplifying, down-converting, and/or demodulating signals received from the anchor node(s) 102 via RF antenna(s) 132. For instance, RF front-end 134 may be configured for modulating and/or demodulating signals using ALOHA modulation and/or time division multiple access (TDMA) modulation. RF front-end 132 may further include one or more mixers and local oscillators for up-converting signals from baseband to an RF carrier frequency for transmission, and/or down-converting received signals from the same or a different RF carrier frequency to baseband for processing by range processor(s) 136. Additionally, RF front-end 134 may include one or more transmit (e.g., power) amplifiers for signal transmission and/or one or more receive (e.g., low noise) amplifiers for signal reception. In some embodiments, multiple mixers and/or local oscillators and/or phase shifters or time delay units may be used, such as for in-phase and quadrature demodulation and/or beam-forming (e.g., using an array of RF antennas 132). In some embodiments, RF front-end 134 may include a digital-to-analog converter (DAC) for signal transmission and/or an analog-to-digital converter (ADC) for signal reception. In some embodiments, RF antennas 132 and/or the RF antenna(s) of the anchor node(s) 102 may be capable of signal transmission over a range of 1000 meters while maintaining a range data precision on the order of centimeters.

In some embodiments, the range processor(s) 136 may be configured to determine range data using RF signals transmitted to and/or received from the anchor node(s) 102. For example, range processor(s) 136 may be configured to determine a distance between RF antenna(s) 132 and an anchor node 102, such as by calculating a one-way time of flight between RF antennas 132 and the anchor node(s) 102 using signals transmitted to and received from the anchor node(s) 102. For instance, in some embodiments, range processor(s) 136 may be configured to record a time when RF signals are transmitted to the anchor node(s) 102 using RF antennas 132 such that, upon reception of RF signals from the anchor node(s) 102, range processor(s) 136 may be configured to determine the round-trip travel time between when the RF signals were transmitted to the anchor node(s) 102 and when the RF signals were received from the anchor node(s) 102. Range processor(s) 136 may be configured to subtract from the round-trip travel time a known delay between when the anchor node(s) 102 are configured to receive RF signals and transmit RF signals in response, and divide the resulting time by two to obtain the one-way travel time of signals transmitted between RF antennas 132 and the anchor node(s) 102. Range processor(s) 136 may be further configured to multiply the one-way travel time by the wave speed of the RF signals (e.g., the speed of light in air) to obtain a distance between RF antennas 132 and the anchor node(s) 102.

It should be appreciated that other techniques for determining a distance between RF antennas 132 and anchor node(s) 102 and/or other types of range data may be used. For example, multiple anchor nodes 102 may be configured to transmit signals to RF subsystem 130 at the same time, and a time difference of arrival (TDOA) of signals received by RF subsystem 130 may indicate respective distances between RF antennas 132 and each anchor node 102.

Figure 5:
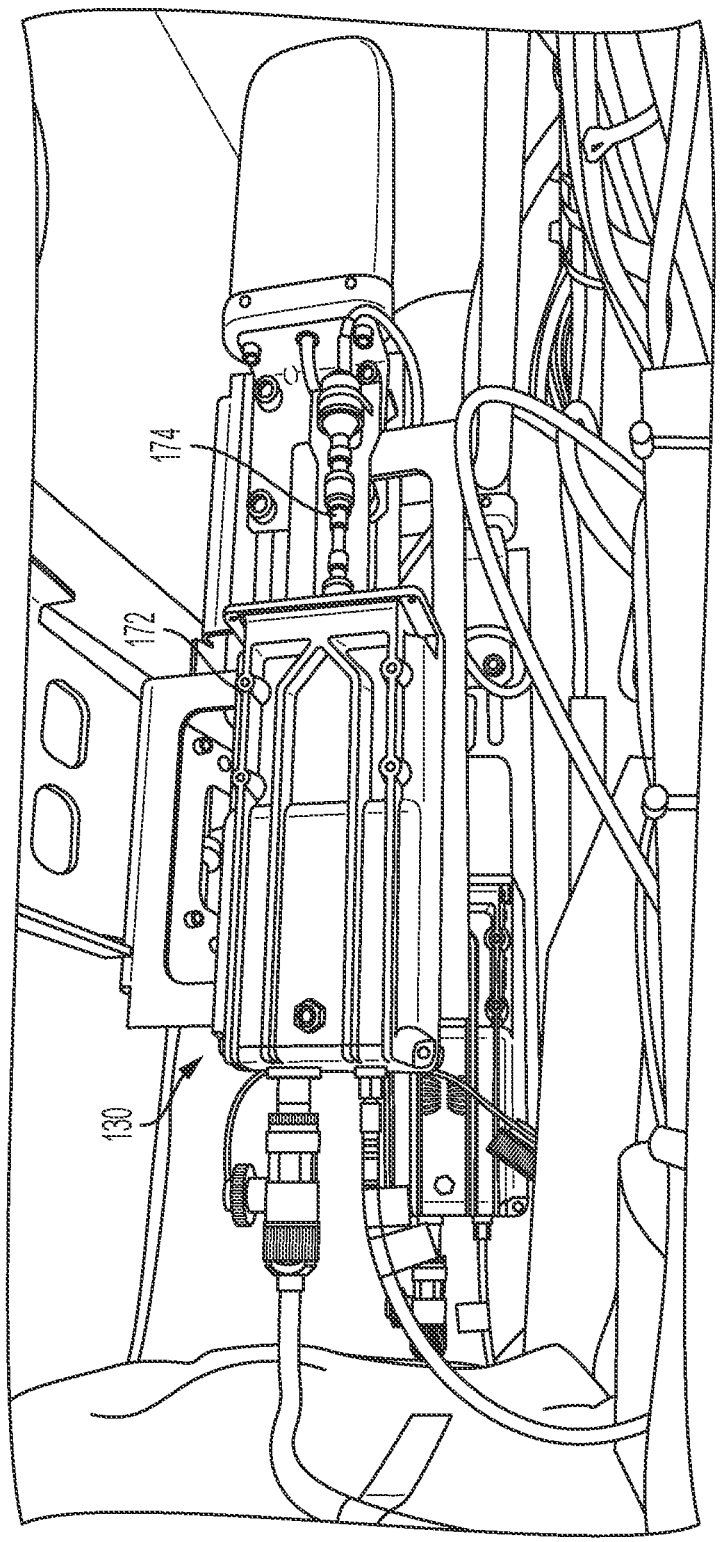
FIG. 5 is a drawing of an illustrative RF subsystem 130 of a system for determining motion characteristics of a train, in accordance with some embodiments of the technology described herein.

FIG. 5 is a drawing of an illustrative RF subsystem 130 of a system 120 for determining motion characteristics of a train, in accordance with some embodiments of the technology described herein. In some embodiments, RF subsystem 130 may be positioned onboard a train. For example, in FIG. 5, RF subsystem 130 is shown in an upper portion of a train car, which may be positioned above the cabin of the train car. In this example, the cabin may house the train crew, passengers, and/or cargo. In some embodiments, multiple RF subsystems 130 or multiple RF antennas of a single RF subsystem may be positioned in a single train car, such as at opposite ends of the train car. For example, an RF subsystem and/or RF antenna positioned at an end of a train car that is not adjacent another train car may be configured to transmit and/or receive RF signals used in range data determination. In this example, RF subsystems 130 positioned on different train cars at ends of the train cars that are adjacent one another may be configured to communicate range data and/or motion characteristics to one another such that the range data and/or motion characteristics may be shared among multiple motion determination systems 120 on the different train cars.

As shown in FIG. 5, RF subsystem 130 includes a housing 172 containing other components of RF subsystem 130. RF subsystem 130 is also shown coupled to an electrical connector 174, which may be a coaxial connector. In some embodiments, electrical connector 174 may be configured to transport high frequency (e.g., RF or baseband) signals to other components of motion determination system 120. For example, one or more RF antennas contained in housing 172 may be configured to provide received signals to electrical connector 174 and/or transmit signals received from electrical connector 174. Alternatively or additionally, the antenna(s) may be configured to transmit signals in response to receiving signals via electrical connector 174. In some embodiments, RF antennas of RF subsystem 130 may be positioned outside of housing 172 and coupled to other components (e.g., processor(s)) of RF subsystem contained within housing 172.

Figure 6:
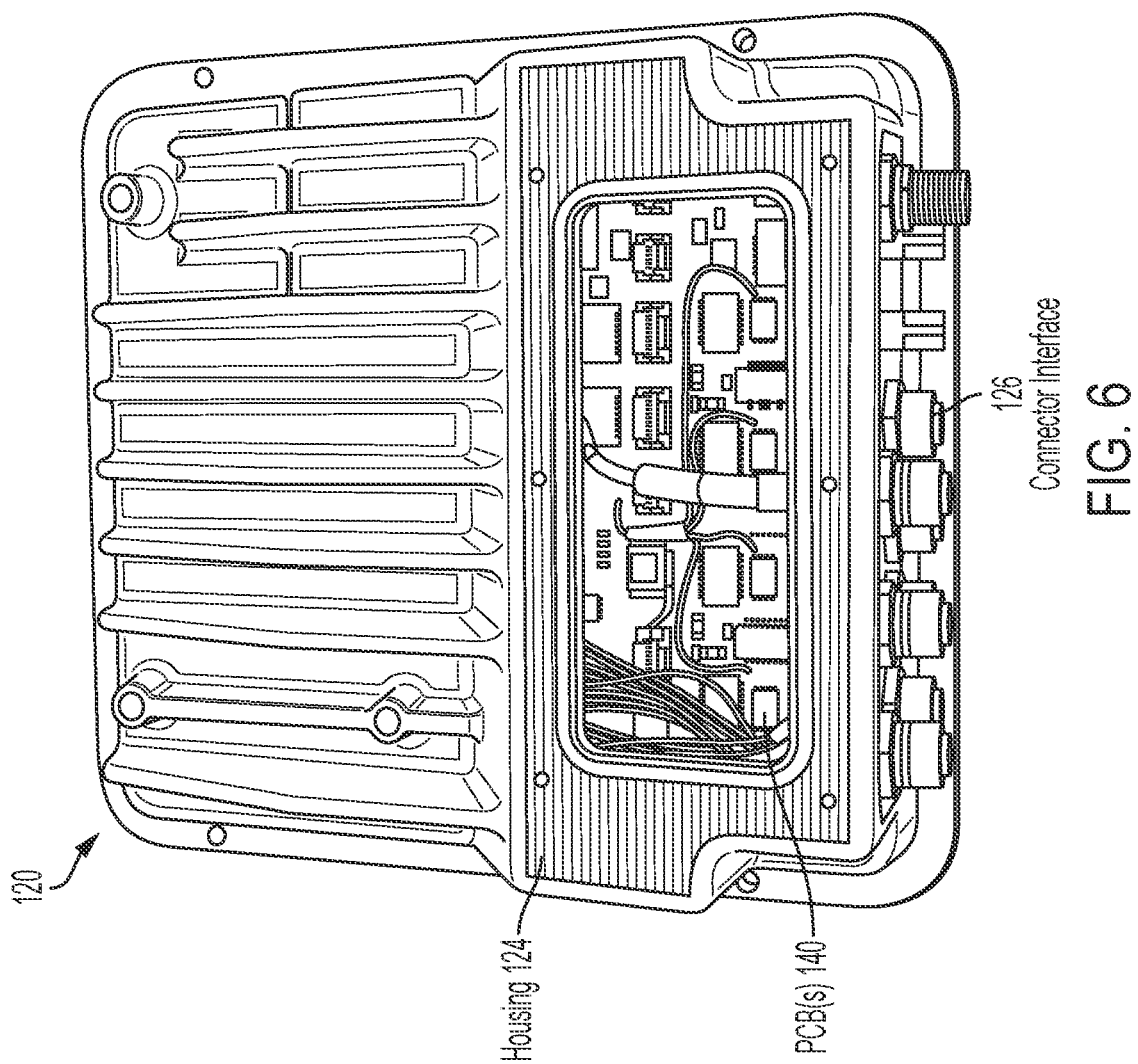
FIG. 6 is drawing of illustrative components of a system for determining motion characteristics of a train, including printed circuit boards 140, a connector interface 126, and a housing 124, in accordance with some embodiments of the technology described herein.

FIG. 6 is drawing of illustrative components of a system 120 for determining motion characteristics of a train, including one or more printed circuit boards (PCBs) 140, a connector interface 126, and a housing 124, in accordance with some embodiments of the technology described herein. As shown in FIG. 6, housing 124 contains PCB(s) 140 and connector interface 126. In some embodiments, housing 124 may have a window exposing at least a portion of PCB(s) 140 to facilitate maintenance of system 120. For example, equipment may be inserted through the window and used to test components of PCB(s) 140. In some embodiments, PCB(s) 140 may include one or more processors, IMU(s), and/or a memory, as described herein including with reference to FIG. 3. In some embodiments, connector interface 126 may be configured for electrically coupling to RF subsystem 130. For example, one or more electrical cables may connect the electrical connector 174 of RF subsystem 130 to connector interface 126 of system 120. Alternatively or additionally, in some embodiments, connector interface 126 may be configured for electrically coupling to train control system 150 via one or more electrical cables and/or over a communication network, and/or other motion determination systems 120 onboard the train via one or more electrical cables and/or over a communication network.

Figure 7:
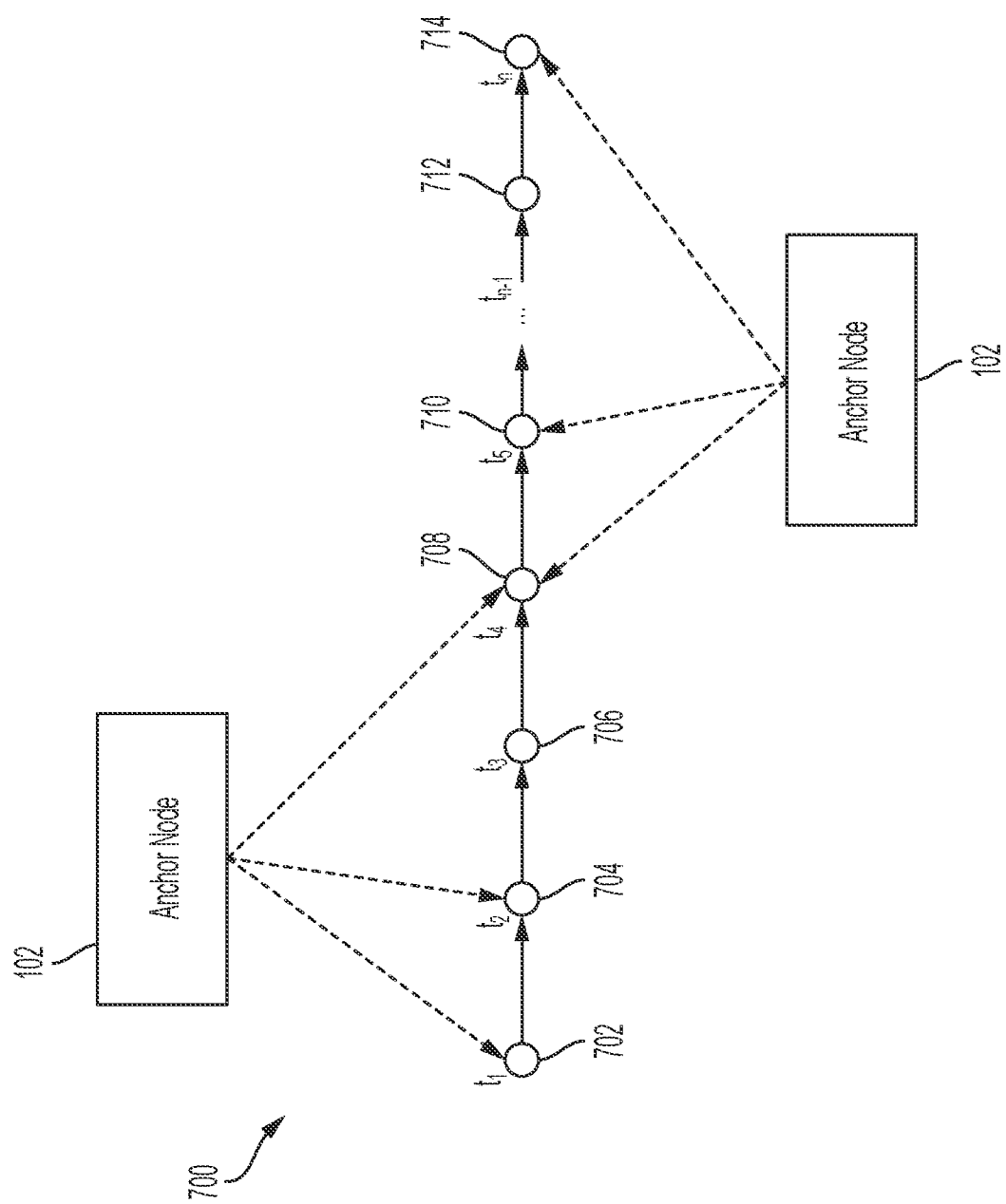
FIG. 7 is a drawing of an exemplary graph 700 of motion characteristics of a train generated by a system for determining motion characteristics of a train, in accordance with some embodiments of the technology described herein.

FIG. 7 is a drawing of an exemplary graph 700 of motion characteristics of a train generated by a system for determining motion characteristics of a train, in accordance with some embodiments of the technology described herein. In FIG. 7, graph 700 includes vertices 702, 704, 706, 708, 710, 712, and 714 arranged in a line, each of which may include motion and/or motion determination characteristics of the train at particular time $t_1$-$t_n$. FIG. 7 also shows anchor nodes 102 positioned on opposite sides of the line of vertices. In some embodiments, vertices of graph 700 may be determined by processor(s) 142 and stored in a memory 144 of a motion determination system 120, as described herein. For example, motion characteristics of each vertex may be stored in memory 144.

In some embodiments, each vertex in graph 700 may include motion and/or motion determination characteristics of the train at a particular time $t_1$-$t_n$. For example, the motion characteristics may include a position of the train, a velocity of the train, an acceleration of the train, a pitch of the train, and/or other motion characteristics as described herein. Motion determination characteristics of the train may include gyroscope and/or accelerometer biases for the IMU(s) 146. For example, the biases may change as the gyroscope and/or accelerometer drift over time, impacting determination of motion characteristics. In some embodiments, the vertices may be spaced evenly in time such that $t_3$-$t_2$ is equal to $t_2$-$t_1$. In some embodiments, the vertices may not be evenly spaced in time, such that $t_3$-$t_2$ is greater than or less than $t_2$-$t_1$.

In some embodiments, a motion determination system 120 onboard the train may be configured to determine the motion and/or motion determination characteristics of each vertex. In FIG. 7, vertex 702 includes motion characteristics that may be determined using RF signals transmitted between the motion determination system 120 and one of the anchor nodes 102, as indicated by the dotted arrow from the anchor node 102 to vertex 702. For example, an RF subsystem 130 the motion determination system 120 may be configured to determine a distance between the train and the anchor node 102 and processor(s) 142 of the motion determination system 120 may be configured to determine the motion characteristics using the determined distance, such as in combination with a known position of the anchor node 102 stored in memory 144. Motion characteristics of vertex 702 may also be determined using the IMU(s) 146 of the motion determination system 120. For example, if there is a conflict between the motion characteristics determined using RF signals and the IMU(s) 146, the motion characteristics determined using RF signals may be used to correct motion characteristics determined using the IMU(s) 146, such as by updating gyroscope and/or accelerometer biases of the motion characteristics of vertex 702 to reduce and/or minimize a residual between the motion characteristics determined using the RF signals and the IMU(s).

As shown in FIG. 7, the train may be within RF transmission range of different anchor nodes 102 at different times. For example, the train is within RF transmission range of one anchor node 102 at times $t_1$, $t_2$, and $t_4$, and another anchor node 102 at times $t_4$, $t_5$, and $t_n$. At time $t_4$, the train is within RF transmission range of both anchor nodes 102. In some embodiments, motion determination system 120 may prioritize only a subset of anchor nodes 102 within RF transmission range of the train, such as anchor nodes 102 that are positioned closest to the train. For example, RF subsystem 130 of motion determination system 130 may be configured to transmit RF signals to each anchor node 102 (e.g., sequentially) and only provide a predetermined number of the smallest determined distances to processor(s) 142 for determination of motion characteristics.

In FIG. 7, vertices 702, 704, 708, 710, and 714 include motion characteristics determined using RF signals transmitted between the motion determination system 120 and the anchor nodes 102, whereas vertices 706 and 712 include motion characteristics that are not determined using RF signals. For example, at times $t_3$ and $t_{n-1}$, no anchor nodes 102 may be in RF transmission range of the train. In some embodiments, motion characteristics of vertices 706 and 712 may be determined using the IMU(s) 146 of motion determination system 120. For example, the IMU(s) 146 may provide signals indicative of the train's acceleration along one or more axes that may be used to determine motion characteristics in combination with motion characteristics determined at previous vertices (e.g., using motion characteristics of vertices 702 and/or 704 for vertex 706). In some embodiments, to compensate for drift in signals from IMU(s) 146, motion characteristics determined using IMU(s) 146, such as for vertex 706, may be updated when motion characteristics are next able to be determined using RF signals, such as for vertex 708 in graph 700. In some embodiments, motion characteristics determined using IMU(s) 146 may be stored with associated uncertainties for the motion characteristics that may be useful in updating the motion characteristics at a later time.

In one example, each vertex of graph 700 may include the following motion and motion determination characteristics: (1) a position of the train in a first direction of elongation of the train track; (2) a velocity of the train in the first direction; (3) a pitch of the train rotationally about a second direction parallel to the ground below the train track and perpendicular to the first direction; (4) an accelerometer bias in the first direction; (5) an accelerometer bias along a third direction perpendicular to the first and second directions; (6) a gyroscope bias in the second direction; and/or (7) an orientation of the train along the first direction (e.g., whether the train is facing forward along the first direction or rearwards along the first direction). In this example, the position of the train in the first direction may be an absolute position with reference to a known trajectory and length of the train track (e.g., stored in memory 144), and the orientation of the train may be fixed during initialization of the motion determination system 120 and may remain static during operation. In this example, the position, velocities, pitch, and orientation of the train are motion characteristics and the accelerometer and gyroscope biases are motion determination characteristics used to determine motion characteristics, as described further herein.

In some embodiments, motion determination characteristics may be initialized to a predetermined value (e.g., 0) and updated as motion characteristics are determined over time, as described further herein. In some embodiments, motion determination characteristics may be calibrated to certain values when the train is expected to have zero acceleration (e.g., when the train is not moving).

In some embodiments, each vertex may also include an associated uncertainty of each motion characteristic. In some embodiments, the associated uncertainties may be used to determine whether to adjust motion determination characteristics. For example, it may be preferable to adjust motion determination characteristics that impact a velocity and/or position having a high uncertainty rather than adjust motion determination characteristics that impact a velocity and/or position having a low uncertainty.

In this example, the motion determination system 120 may apply a plurality of constraints to the motion and/or motion determination characteristics. Motion determination system 120 may adjust some or all of the motion characteristics of one or more vertices to reduce and/or minimize the residuals of each constraint. A first possible constraint incorporating range data received using RF subsystem 130 is shown below:

$$\text{range\_residual} = \text{range\_meas} - \|\text{pos\_map} + \text{RFsubsys\_offset} - \text{anchor\_pos}\| \quad (1)$$

where range_meas is a distance between the train and an anchor node determined using RF subsystem 130, pos_map is a position of the train in the first direction estimated using IMU(s) 146 and/or previously determined motion characteristics, RFsubsys_offset is a distance indicating a position of RF subsystem 130 (e.g., RF antennas of the subsystem) along the train, and anchor_pos is a known position of the anchor node in the first direction. In some embodiments, the first possible constraint may only be applied when a distance between the train and an anchor node can be determined, such as when the train is within RF transmission range of an anchor node (e.g., for vertices 702, 704, 708, 710, and 714).

In some embodiments, a plurality of constraints may incorporate data from IMU(s) 146. Such constraints may be applied at each vertex, even if the train is not within RF transmission range of an anchor node. A second possible constraint incorporating data from IMU(s) 146 is shown below:

$$\text{pos\_residual} = \text{pos\_2} - (\text{pos\_1} + V\text{avg}*dt) \quad (2)$$

where pos_2 is the position of the train for the current vertex (e.g., vertex 704) in the first direction, pos_1 is an estimated and/or determined position of the train for a previous vertex (e.g., vertex 702) in the first direction, Vavg is an estimated average velocity of the train in the first direction between pos_1 and pos_2 (e.g., using an estimated and/or determined velocity of one or more previous vertices), and dt is a time elapsed between the current vertex and the previous vertex or vertices (e.g., $t_2 - t_1$). In some embodiments, the average velocity Vavg may be estimated using velocities described further herein.

A third possible constraint is shown below:

$$Vx\_\text{residual} = V\_2 - (V\_1 + \text{est\_accel}x*dt) \quad (3)$$

where V_2 is the velocity of the train in the first direction for the current vertex (e.g., vertex 274), V_1 is an estimated and/or determined velocity of the train in the first direction for a previous vertex (e.g., vertex 702), est_accelx is an estimated acceleration of the train in the first direction between V_1_ and V_2, and dt is the time elapsed between the current vertex and the previous vertex or vertices (e.g., $t_2-t_1$).

In some embodiments, the estimated acceleration est_accelx may be determined using current IMU data, as shown below:

$$\text{est\_accel}x = \text{IMU\_accel}x - \text{gravity}x - \text{accel\_bias\_}x \quad (4)$$

where IMU_accelx is an acceleration of the train in the first direction determined using one or more signals output from IMU(s) 146, gravityx is the gravitational acceleration of the train in the first direction, and accel_bias_x is the accelerometer bias in the first direction.

In some embodiments, the gravitational acceleration gravityx may be determined using current IMU data and a previously estimated and/or determined pitch of the train rotationally about the second direction, as shown below:

$$\text{gravity}x = (\text{gravity}/\text{est\_gyro})^*(\cos(P\_1) - \cos(P\_2))/dt \quad (5)$$

where gravity is the gravitational constant of approximately 9.8 m/s², est_gyro is an estimated acceleration of the train rotationally about the second direction, P_2 is the pitch of the train rotationally about the second direction for the current vertex (e.g., vertex 704), P_1 is an estimated pitch of the train rotationally about the second direction for a previous vertex (e.g., vertex 702), and dt is the time elapsed between the current vertex and the previous vertex (e.g., $t_2-t_1$).

In some embodiments, the estimated acceleration est_gyro may be determined using current IMU data as shown below:

$$\text{est\_gyro} = \text{IMU\_gyro\_}y - \text{gyro\_bias\_}y \quad (6)$$

where IMU_gyro_y is an acceleration of the train rotationally about the second direction determined using one or more signals output from IMU(s) 146 and gyro_bias_y is the gyroscope bias in the second direction.

A fourth possible constraint is shown below:

$$Vz\_\text{residual} = \text{est\_accel}z^*dt \quad (7)$$

where est_accelz is an estimated acceleration of the train in the third direction for the current vertex (e.g., vertex 704) estimated using motion and/or motion determination characteristics of a previous vertex (e.g., vertex 702) and dt is the time elapsed between the current vertex and the previous vertex (e.g., $t_2-t_1$).

IN some embodiments, the estimated acceleration of the train in the third direction may be determined using current IMU data and a previously estimated and/or determined pitch of the train rotationally about the second direction, as shown below:

$$\text{est\_accel}z = \text{IMU\_accel}z - \text{gravity}z - \text{accel\_bias\_}z \quad (8)$$

where IMU_accelz is an acceleration of the train in the third direction determined using one or more signals output from IMU(s) 146, gravityz is the gravitational acceleration of the train in the third direction, and accel_bias_z is the accelerometer bias in the third direction.

In some embodiments, the gravitational acceleration gravityz may be determined using current IMU data and a previously estimated and/or determined pitch of the train rotationally about the second direction, as shown below:

$$\text{gravity}z = (\text{gravity}/\text{est\_gyro})^*(\sin(P\_1) - \sin(P\_2))/dt \quad (9)$$

where est_gyro, P_1, P_2, and dt are the same as described above for gravityx.

A fifth possible constraint is shown below:

$$\text{pitch\_residual} = P\_2 - (P\_1 + \text{est\_gyro}^*dt) \quad (10)$$

where P_2, P_1, est_gyro, and dt are the same as described above for gravityx and gravityz.

In some embodiments, motion determination system 120 may be configured to reduce and/or minimize each residual by adjusting the motion characteristics and/or motion determination characteristics of the current vertex and/or previous vertices. For example, pitch_residual may be reduced and/or minimized upon adjusting gyro_bias_y. When gyro_bias_y is adjusted by making it larger or smaller, gravityx and gravityz may be adjusted accordingly, thereby having an effect on Vz_residual and Vx_residual. The effect on Vz_residual and Vx_residual may be used, at least in part, to determine whether to make gyro_bias_y larger or smaller. Similarly, pos_2 may be set equal to pos_map, and pos_residual may be reduced and/or minimized by adjusting pos_1 and/or Vavg, which may also have an effect on Vz_residual and Vx_residual.

In some embodiments, processor(s) 142 of motion determination system may be configured to determine the motion and/or motion determination characteristics of the current and/or previous vertices using a best-fit optimization technique, such as a graph-based optimization technique. In some embodiments, the graph-based optimization technique may include pose graph optimization, factor graph optimization, and/or non-linear least squares optimization. In some embodiments, such techniques may employ a Bayesian estimation algorithm (e.g., executed on the processor(s)), such as including a Bayesian filter. In some embodiments, the filter may include an extended Kalman filter, an unscented Kalman filter, and/or a particle filter.

In some embodiments, each vertex of graph 700 may alternatively or additionally include a roll of the train rotationally about the first direction and/or a yaw of the train rotationally about the third direction.

FIG. 8 is a drawing of an illustrative method 800 for determining motion characteristics of a train traveling along a train track, in accordance with some embodiments of the technology described herein. The method may be performed using motion determination systems 120 described herein. In FIG. 8, the method 800 includes receiving range data from one or more RF antennas of the motion determination system at step 802, receiving IMU data from one or more IMUs of the motion determination system at step 804, and determining motion characteristics of the train using the range data and the IMU data at step 806, such as by using one or more processors of the motion determination system.

In some embodiments, receiving the range data at step 802 may include receiving data indicating a distance between the train and one or more anchor nodes positioned along the train track obtained via an exchange of wireless signals between the RF antenna(s) and the anchor node(s). For instance, the processor(s) of the motion determination system onboard the train (e.g., one or more range processor(s) of an RF subsystem) may calculate the distance using a time of flight of signals transmitted to the anchor node(s) and signals subsequently received from the anchor node(s) in response. Using the determined distance in combination with previously determined motion characteristics and/or the known position(s) of the anchor node(s) the processor(s) may be configured to determine a position, velocity, and/or acceleration of the train.

In some embodiments, receiving the IMU data may include receiving data indicating a position, velocity, and/or acceleration of the train generated using the IMU(s) onboard the train. For example, the processor(s) onboard the train may receive one or more motion measurements from the IMU(s) indicating one or more accelerations of the train in one or more directions (e.g., roll, pitch, yaw). In some cases, acceleration at least partially perpendicular to the track (e.g., pitch) may indicate an uphill or downhill slope of the track on which the train is traveling. The processor(s) may be configured to determine the position, velocity, and/or acceleration of the train using the IMU data (e.g., using the acceleration measurements), such as by using previous position, velocity, and/or acceleration data stored in the memory in combination with the IMU data. In some embodiments, the processor(s) may estimate motion characteristics of the train using the IMU data and correct the estimation using the range data in the next step.

In some embodiments, determining the motion characteristics at step 806 may include determining a position, velocity, and/or acceleration of the train using the range data and/or the IMU data. In one example, the processor(s) may be configured to determine that motion characteristics determined using the range data are inconsistent with motion characteristics determined using the IMU data and only use the range data to determine the motion characteristics. Alternatively or additionally, the processor(s) may correct the IMU data using the range data, such as by adjusting gyroscope and/or accelerometer biases to reduce and/or minimize residuals between motion characteristics determined using the range data and using the IMU data. In some embodiments, the processor(s) may correct motion characteristics previously determined using IMU data and stored in a memory of the system. For instance, determining the motion characteristics may further include correcting the stored motion characteristics from the memory when reducing and/or minimizing the residuals (e.g., to ensure consistency between the current and previously determined motion characteristics). In one example, a previously stored acceleration of the train may indicate a velocity that is inconsistent with a velocity determined based on the range data and/or IMU data, and the previously stored acceleration may be corrected at this step.

In some embodiments, the processor(s) may be configured to determine the motion characteristics by using stored motion characteristics estimated using IMU data. For example, using previous acceleration estimates (e.g., indicating an uphill or downhill slope of the train), the processor(s) may be configured to determine a current position as well as velocities and/or accelerations of the train. In some cases, the motion characteristic determinations may be calculated using a best-fit optimization technique, such as a graph-based optimization technique, as described herein including with reference to FIG. 7. For instance, in some embodiments, such techniques may employ a Bayesian estimation algorithm (e.g., executed on the processor(s)), such as including an extended Kalman filter, an unscented Kalman filter, and/or a particle filter. To verify and/or the estimates, the processor(s) may compare the estimated motion characteristics with those determined using range data from the antenna(s). The processor(s) may adjust the estimates to make final determinations of motion characteristics based on consistencies and/or inconsistencies between the estimations and the determinations using the range data. It should be appreciated that finalized motion characteristics may be updated later in time, such as when stored in the memory for use in future determinations.

It should be appreciated that some embodiments do not include receiving the range data (e.g., for systems that do not include the antenna(s)) or do not include receiving the IMU data (e.g., for systems that do not include the IMU(s)). Accordingly, in some embodiments, determining motion characteristics may include making such a determination using only one modality of data (e.g., range data, IMU data, etc.). In such embodiments, motion characteristics stored in the memory of the motion determination system may be incorporated during determination of the motion characteristics.

In some embodiments that include the antenna(s), the method further includes initializing the antenna(s) at least in part by transmitting signals to multiple anchor nodes and determining which anchor nodes are within a predetermined range and/or closest to the train. For example, the range processor(s) may be configured to determine the direction and range from which signals from the anchor nodes closest to the train (or those within the predetermined range) were received. In some embodiments, receiving the range data may include incorporating signals received from anchor nodes closest to the train (e.g., the two closest) and/or using anchor nodes within a predetermined range of the train (e.g., 500 meters). In some embodiments, initializing the antenna(s) may include determining which track the train is traveling along at least in part by determining which anchor nodes are closest to the train.

Figure 9A:
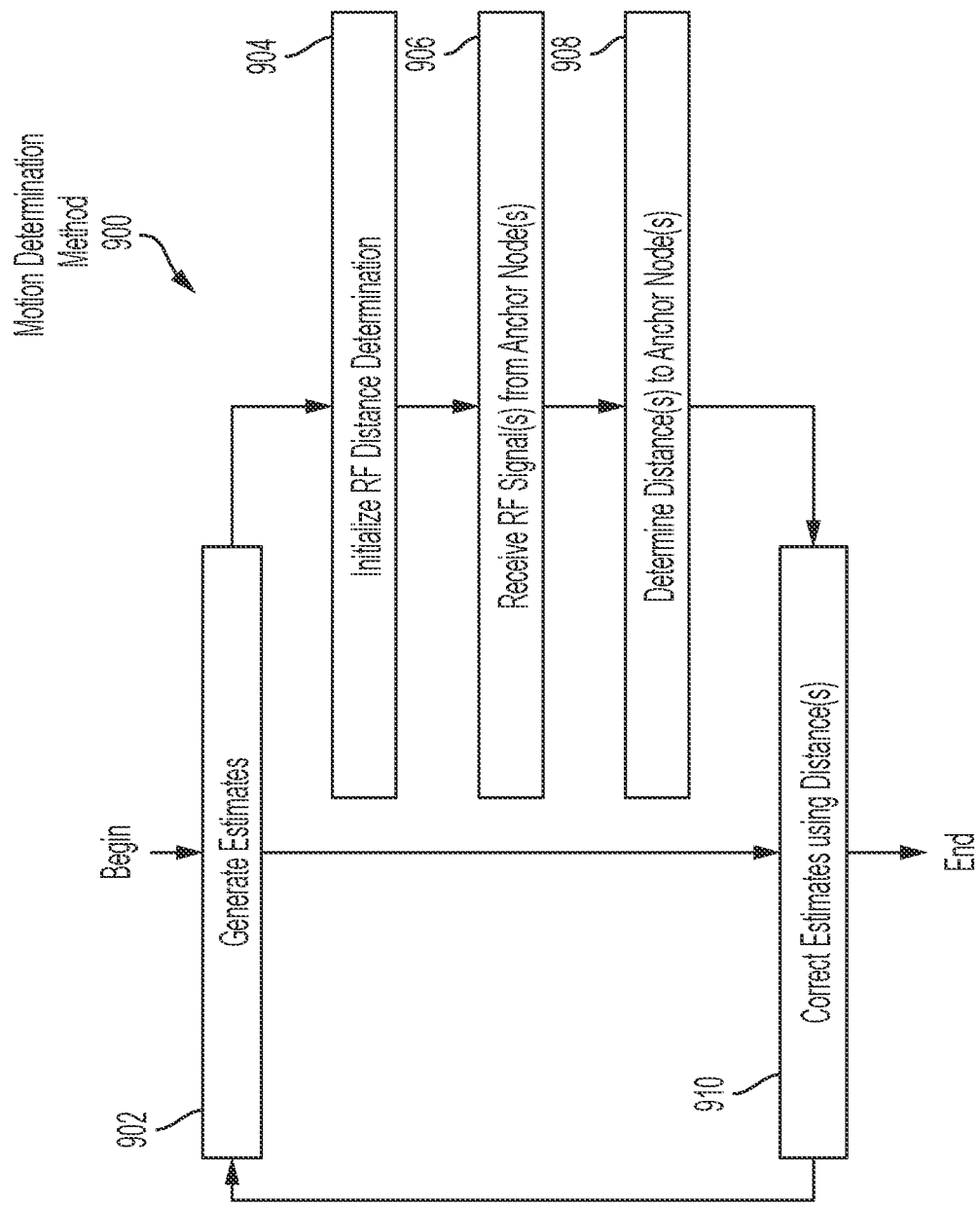
FIG. 9A is a drawing of an illustrative method 900 for determining motion characteristics of a train traveling along a train track using inertial measurement unit (IMU) data and radio frequency (RF) data, in accordance with some embodiments of the technology described herein.

FIG. 9A is a drawing of an illustrative method 900 for determining motion characteristics of a train traveling along a train track using inertial measurement unit (IMU) data and radio frequency (RF) data, in accordance with some embodiments of the technology described herein. As shown in FIG. 9A, method 900 includes generating estimates of motion characteristics of the train at step 902, initializing RF distance determination at step 904, receiving one or more RF signals from one or more anchor nodes at step 906, determining one or more distances to the anchor node(s) at step 908, and correcting the estimates of the motion characteristics using the determined distance(s) at step 910. In some embodiments, method 900 may be performed by a motion determination system 120, as described herein.

In some embodiments, generating estimates of motion characteristics at step 902 may include receiving IMU data from one or more IMU(s) 146 at processor(s) 142. For example, the IMU data may include one or more signals indicating rotational acceleration of the train along one or more axes (e.g., about the first, second, and/or third directions described herein). In this example, processor(s) 142 may estimate a position, pitch (e.g., about the second direction) and/or one or more velocities and/or accelerations of the train using the signals received from the IMU(s) 146 and store these motion characteristics in memory 144.

In some embodiments, initializing RF distance determination at step 904 may include transmitting a first RF signal from RF subsystem 130 to one or more anchor nodes. For example, RF subsystem 130 may transmit first RF signals periodically as the train travels along the train track. In some embodiments, RF front-end 143 may convert the first RF signal to the analog domain, modulate (e.g., up-convert) the first RF signal to RF frequencies, and amplify the first RF signal before RF antenna(s) 132 transmits the first RF signal to the anchor node(s). Alternatively or additionally, in some embodiments, initializing RF distance determination at step 904 may include entering a passive detection mode whereby RF antenna(s) 132 are configured to detect RF signals from anchor nodes positioned along the train track. For example, the anchor nodes may be configured to periodically transmit RF signals at the same time.

In some embodiments, receiving RF signals from the anchor node(s) at step 906 may include receiving a second RF signal from the anchor node(s) at RF subsystem 130 in response to transmitting a first RF signal at step 904. For example, RF front-end 143 may receive the second RF signal from RF antenna(s) 132, amplify the second RF signal, demodulate (e.g., down-convert) the second RF signal to baseband, and convert the second RF signal to the digital domain before providing the second RF signal to range processor(s) 136). In some embodiments, receiving RF signals at step 906 may not be preceded by transmission of first RF signals at step 904, such as when the anchor nodes are configured to periodically transmit RF signals at the same time.

In some embodiments, determining the distance(s) to the anchor node(s) at step 908 may include processing (e.g., using range processor(s) 136) received signals determine the distance(s). For example, when a first RF signal is transmitted at step 904 and a second RF signal is received at step 906, the time between transmitting the first RF signal and receiving the second RF signal may be used to determine a distance between RF subsystem 130 and the anchor node(s), as described herein. Alternatively or additionally, when RF signals are transmitted by multiple anchor nodes at the same time are received at step 906, the differences between when the first signals are received at RF subsystem 130 may indicate respective distances between the train and each anchor node. In some embodiments, range processor(s) 136 may provide the determined distance(s) to processor(s) 142 of motion determination system 120.

In some embodiments, correcting the estimates of the motion characteristics at step 910 may include adjusting the motion characteristics estimated at step 902 in view of the distance(s) determined at step 908. For example, an estimated position of the train generated at step 902 may be different from a position based on a distance between the train and an anchor node determined at step 908 and a known position of the anchor node. In some embodiments, estimated motion characteristics such as pitch, velocities, and/or accelerations may be adjusted to reduce and/or minimize a difference between the position estimated at step 902 and the position based on the distance determined at step 908. In some embodiments, motion determination characteristics such as gyroscope and/or accelerometer biases of the IMU(s) 146 may be adjusted to reduce and/or minimize the difference. In some embodiments, multiple residuals (e.g., position, velocity, acceleration, and/or pitch) may be reduced and/or minimized in this manner, such as described herein including with reference to FIG. 7.

Figure 9B:
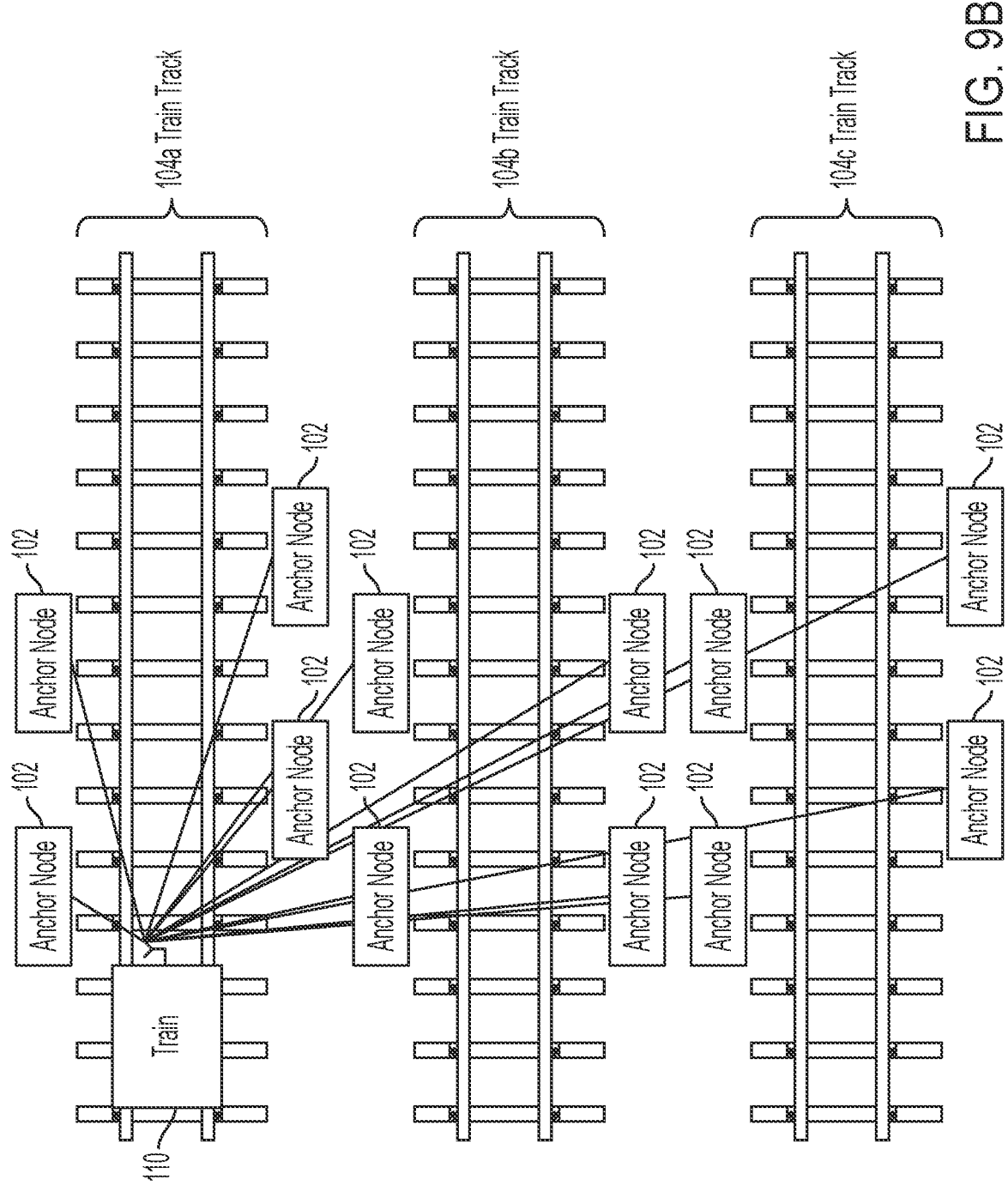
FIG. 9B is a drawing of a train 110 on a train track 104a during the RF distance determination initialization step 904 of the method 900 of FIG. 9A, in accordance with some embodiments of the technology described herein.

FIG. 9B is a drawing of a train 110 on a train track 104a during the RF distance determination initialization step 904 of the method 900 of FIG. 9A, in accordance with some embodiments of the technology described herein. In FIG. 9B, train track 104a and two other train tracks 104b and 104c are elongated parallel to one another with anchor nodes 102 positioned along each set of train tracks 104a, 104b, and 104c. In FIG. 9B, one or more RF subsystems 130 onboard the train 110 transmit RF signals to and/or receive RF signals from various ones of the anchor nodes 102.

In some embodiments, the RF subsystem(s) 130 may be configured to transmit RF signals to as many anchor nodes 102 as are within RF transmission range of the RF subsystem(s) 130 during the initialization step 904. In some embodiments, the motion determination system(s) 120 onboard the train 110 may be configured to determine the position of the train 110 using range data obtained via transmitting and/or receiving RF signals to and/or from the anchor nodes 102. In some embodiments, during the RF distance determination step 904, the motion determination system(s) 120 may be configured to determine which anchor nodes 102 the RF subsystem(s) 130 transmitted RF signals to and/or received RF signals from, such that known positions of the anchor nodes 102 may be used to determine the position of the train 110, as described herein. In some embodiments, the RF subsystem(s) 130 may be configured to receive RF signals transmitted from the anchor nodes 102 at the same time, rather than in response to RF signals transmitted from RF subsystem(s) 130.

In some embodiments, the motion determination system 120 may be configured to determine which track (e.g., of tracks 104a, 104b, and 104c) the train 110 is on. For example, the RF subsystem(s) 130 onboard the train 110 may be configured to transmit RF signals over different respective RF channels (e.g., frequency division multiplexed channels, time division multiplexed channels, code division multiplexed channels, etc.). In this example, an anchor node 102 positioned next to a track may be configured to respond by transmitting RF signals when an RF signal is received at the anchor node 102 over the appropriate RF channel for the track next to the anchor node 102 (e.g., with one RF channel associated with each track). In another example, the anchor node 102 may be configured to respond when an RF signal is received over an appropriate channel for the particular anchor node 102. In some embodiments, RF signals received from an anchor node 102 over a particular channel may provide an indication of which track the anchor node 102 is positioned next to and/or which anchor node 102 along the track sent the RF signal. In the example of FIG. 9B, the motion determination system 120 may be configured to determine that the train is on train track 104a by transmitting RF signals over one or more RF channels associated with track 104a and receiving RF signals from anchor nodes 102 positioned along track 104a.

In some embodiments, RF subsystem(s) 130 may be configured to transmit RF signals only to anchor nodes 102 positioned next to the track the train 110 is on. For example, RF subsystem(s) 130 may be configured to transmit RF signals only over one or more RF channels associated with anchor nodes 102 positioned next to the track the train 110 is on. In this example, motion determination system(s) 120 on train 110 may be configured to determine which track train 110 is on using an estimated position of the train 110 stored in memory 144 and a known position of each track stored in memory 144. In the example of FIG. 9B, RF subsystem(s) 130 may transmit RF signals to anchor nodes 102 positioned along track 104a.

In some embodiments, RF subsystem(s) 130 may be configured to transmit RF signals only to anchor nods 102 positioned closest to the train 110. For example, RF subsystem(s) 130 may be configured to transmit RF signals only over one or more RF channels associated with anchor nodes 102 estimated to be positioned closest to train 110, such as using an estimated position of train 110 in memory 144 and known positions of anchor nodes 102 stored in memory 144. In some embodiments, RF subsystem(s) 130 may be configured to transmit RF signals to anchor nodes 102 positioned within a predetermined range of train 110, such as within 1 kilometer (km) and/or within 500 meters (m) of train 110. Alternatively or additionally, RF subsystem(s) 130 may be configured to transmit RF signals to only a predetermined number of anchor nodes 102 positioned closest to train 110, such as the 5 anchor nodes 102 closest to train 110 and/or the 2 anchor nodes 102 closest to train 110.

Figure 10:
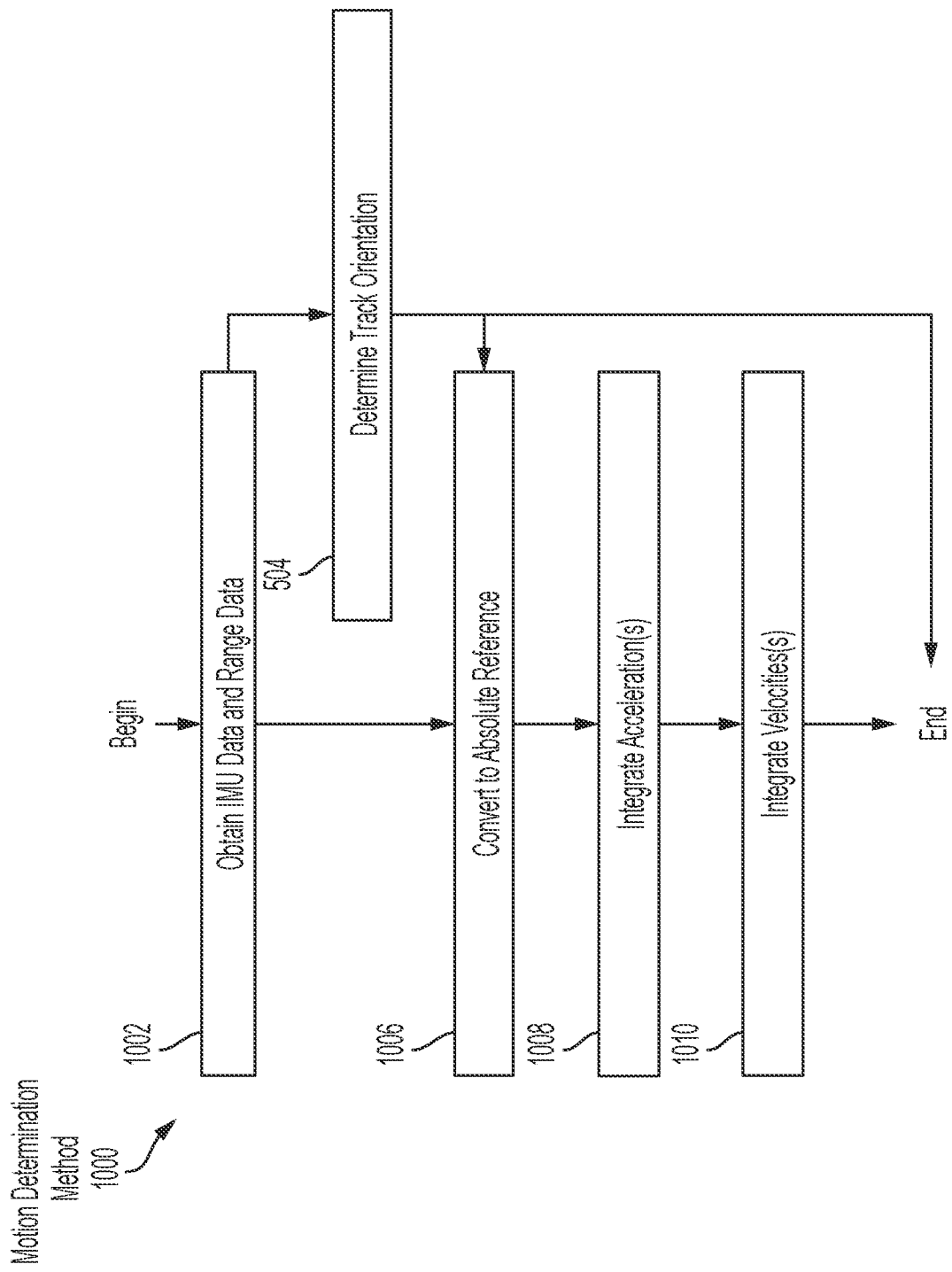
FIG. 10 is a drawing of an illustrative method 1000 for determining motion characteristics of a train traveling along a train track using IMU data and RF data, in accordance with some embodiments of the technology described herein.

FIG. 10 is a drawing of an illustrative method 1000 for determining motion characteristics of a train traveling along a train track using IMU data and RF data, in accordance with some embodiments of the technology described herein. In FIG. 10, method 1000 includes obtaining IMU data and range data at step 1002, determining an orientation of the train track at step 1004, converting the IMU and range data to an absolute reference frame at step 1006, integrating one or more accelerations of the IMU and range data at step 1008, and integrating one or more velocities at step 1010. In some embodiments, method 1000 may be performed using processor(s) 142 of motion determination system 120. In some embodiments, method 1000 may be used to determine motion characteristics for one or more vertices of graph 700 in FIG. 7.

In some embodiments, obtaining IMU data and range data at step 1002 may include loading the IMU and/or range data from memory 144. For example, the IMU and/or range data may have been previously determined and/or estimated using processor(s) 142 and stored in memory 144. Alternatively or additionally, the IMU and/or range data may be obtained directly from the IMU(s) 146 and/or RF subsystem(s) 130. In some embodiments, the IMU data may include one or more signals from IMU(s) 146 indicative of acceleration of train 110 in one or more directions and/or rotationally about one or more axes. In some embodiments, the IMU data may include one or more estimated accelerations in one or more directions and/or rotationally about one or more axes. In some embodiments, the IMU data may include values of gyroscope and/or accelerometer biases stored in memory 144. In some embodiments, the range data may include one or more distances between train 110 and one or more anchor nodes determined using RF subsystem(s) 130. In some embodiments, the range data may include one or more known positions of the anchor nodes. In some embodiments, the range data and/or IMU data may include motion characteristics determined for a previous vertex (e.g., of graph 700), and the range data and/or IMU data may be used to determine motion characteristics for a current vertex.

In some embodiments, determining the orientation of the train track at step 1004 may include determining a trajectory of the train track using IMU data indicating a detected pitch, roll, and/or yaw of the train. For example, the detected pitch, roll, and/or yaw acceleration of the train may be used to determine a position of the train along the train track, such as when a roll acceleration of the train indicates a turn in the train track and/or a pitch acceleration of the train indicates an uphill or downhill slope in the train track. In some embodiments, determining the orientation of the train track may include determining which in direction along the train track the train is traveling.

In some embodiments, converting the IMU data and range data to an absolute reference frame at step 1006 may include associating the IMU data and range data with an estimated and/or determined position of the train along a track, and/or away from the track. For example, the absolute reference frame may include a trajectory (e.g., length) of the track and/or a trajectory towards and/or away from the track in a direction perpendicular to the ground below the track. In this example, an estimated acceleration of the train in a direction parallel to the trajectory of the track may be associated with an estimated position of the train along the trajectory of the track. Alternatively or additionally, a determined distance between the train and an anchor node having a known position may be associated with the estimated position of the train along the trajectory of the track.

In some embodiments, integrating the acceleration(s) at step 1008 may include integrating over an elapsed time such that the integrated acceleration(s) result in one or more velocities at an end of the elapsed time. For example, the elapsed time may be a time between a previous vertex (e.g., of graph 700) and a current vertex. In this example, the result(s) of the integration may be added to and/or subtracted from one or more velocities of the previous vertex to result in a velocity for the current vertex. In some embodiments, processor(s) 142 may be configured to approximate the integration. In some embodiments, processor(s) 142 may be configured to integrate a first estimated acceleration in a first direction parallel to a direction of elongation of the train track to determine a first velocity in the first direction and a second estimated acceleration in a second direction perpendicular to the ground below the train track to determine a second velocity in the second direction. In some embodiments, integrating the acceleration(s) at step 1008 may include storing the resulting velocities in memory 144. In some embodiments, processor(s) 142 may be configured to determine a pitch of the train (e.g., rotationally about a third direction perpendicular to the first and second directions) by integrating a pitch acceleration of the train (e.g., estimated using IMU(s) 146) over the elapsed time and adding the result to and/or subtracting the result from a pitch of a previous vertex (e.g., of graph 700).

In some embodiments, integrating the velocity or velocities at step 1010 may include integrating over an elapsed time such that the integrated velocities result in a position and/or pitch at an end of the elapsed time. For example, the elapsed time may be the same elapsed time as described in connection with step 1008. In this example, the result(s) of the integration may be added to and/or subtracted from a position and/or pitch of the previous vertex to result in a position and/or pitch for the current vertex. In some embodiments, processor(s) 142 may be configured to approximate the integration. In some embodiments, processor(s) 142 may be configured to integrate a velocity in the first direction to determine a position of the train along the train track in the first direction. In some embodiments, integrating the velocity or velocities at step 1010 may include storing the resulting velocities in memory 144. In some embodiments, processor(s) 142 may estimate multiple positions using multiple sources of data (e.g., range data and IMU data) and iteratively adjust motion determination characteristics to reduce and/or minimize a difference between the multiple position estimates to determine a position of the train.

Figure 11:
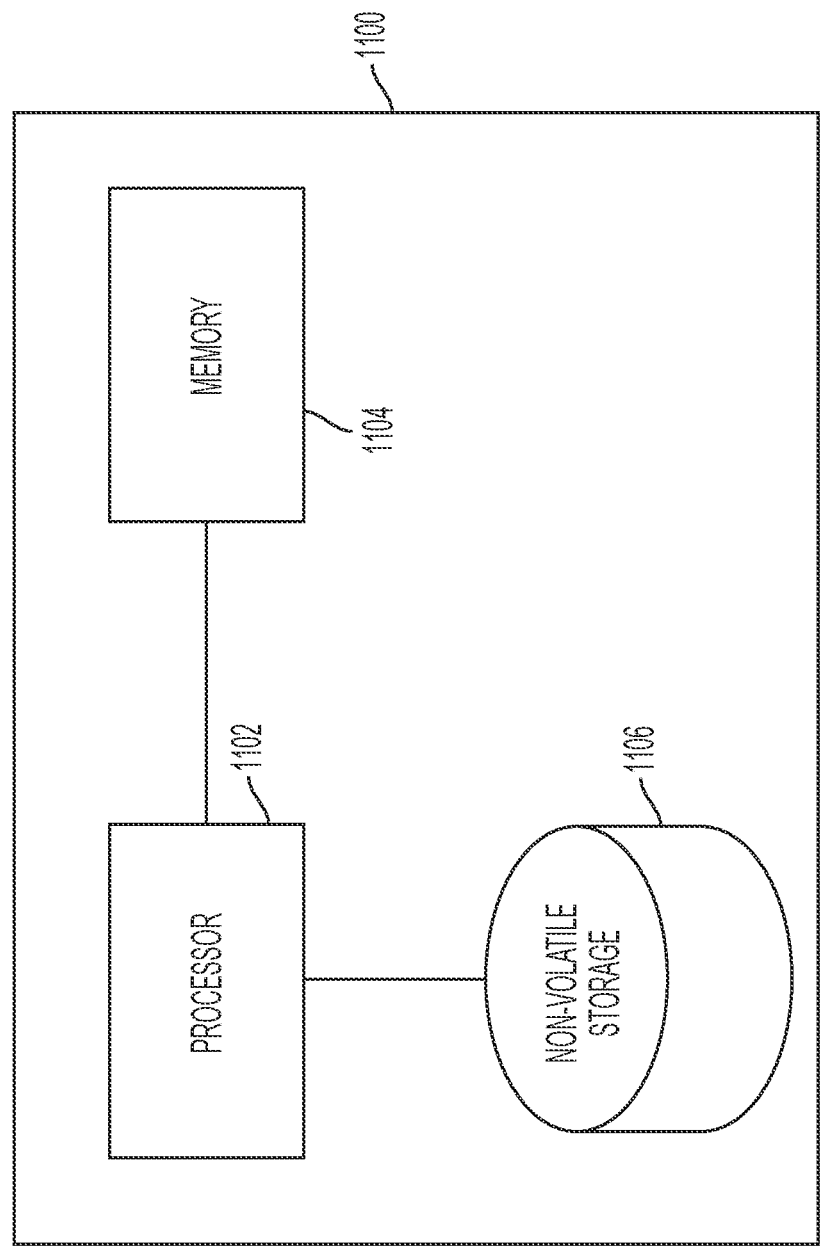
FIG. 11 is a drawing of an illustrative computer system 1100 on which some embodiments described herein may be implemented.

FIG. 11 is a diagram of an illustrative computer system on which embodiments described herein may be implemented. An illustrative implementation of a computer system 1100 that may be used in connection with any of the embodiments of the disclosure provided herein is shown in FIG. 8. For example, the processes described with reference to FIG. 8 may be implemented using computer system 1100. As another example, the computer system 1100 may be used to train and/or use any of the neural network statistical models described herein. The computer system 1100 may include one or more processors 1102 and one or more articles of manufacture that comprise non-transitory computer-readable storage media (e.g., memory 1104 and one or more non-volatile storage media 1106). The processor 1102 may control writing data to and reading data from the memory 1104 and the non-volatile storage device 1106 in any suitable manner, as the aspects of the disclosure provided herein are not limited in this respect. To perform any of the functionality described herein, the processor 1102 may execute one or more processor-executable instructions stored in one or more non-transitory computer-readable storage media (e.g., the memory 1104), which may serve as non-transitory computer-readable storage media storing processor-executable instructions for execution by the processor 1102.

Having thus described several aspects and embodiments of the technology set forth in the disclosure, it is to be appreciated that various alterations, modifications, and improvements will readily occur to those skilled in the art. Such alterations, modifications, and improvements are intended to be within the spirit and scope of the technology described herein. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments can be implemented in any of numerous ways. One or more aspects and embodiments of the present disclosure involving the performance of processes or methods may utilize program instructions executable by a device (e.g., a computer, a processor, or other device) to perform, or control performance of, the processes or methods. In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above. The computer readable medium or media can be transportable, such that the program or programs stored thereon can be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that can be employed to program a computer or other processor to implement various aspects as described above. Additionally, it should be appreciated that according to one aspect, one or more computer programs that when executed perform methods of the present disclosure need not reside on a single computer or processor, but may be distributed in a modular fashion among a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or"

should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The terms "approximately" and "about" may be used to mean within ±20% of a target value in some embodiments, within ±10% of a target value in some embodiments, within ±5% of a target value in some embodiments, within ±2% of a target value in some embodiments. The terms "approximately" and "about" may include the target value.

What is claimed is:

1. A system for determining motion characteristics of a train traveling along a train track, the system comprising:
    at least one RF antenna configured to receive RF signals from at least one anchor node positioned proximate the train track;
    at least one inertial measurement unit (IMU) configured to generate IMU data responsive to motion of the train along the train track; and
    at least one processor configured to:
        determine at least one distance between the at least one RF antenna and the at least one anchor node using at least one of the RF signals received by the at least one RF antenna from the at least one anchor node positioned proximate the train track; and
        determine one or more motion characteristics of the train by processing the at least one distance and the IMU data using a Bayesian estimation algorithm, wherein processing the at least one distance and the IMU data to determine the one or more motion characteristics includes:
            inputting the at least one distance to the Bayesian estimation algorithm;
            inputting the IMU data to the Bayesian estimation algorithm; and
            obtaining the one or more motion characteristics as an output from the Bayesian estimation algorithm produced by the Bayesian estimation algorithm based, at least in part, on the at least one distance and the IMU data.

2. The system of claim 1, wherein the one or more motion characteristics are selected from a group consisting of: position, velocity, acceleration, position uncertainty, velocity uncertainty, and acceleration uncertainty.

3. The system of claim 1, wherein the one or more motion characteristics includes velocity.

4. The system of claim 1, wherein the at least one processor comprises:
    a first processor communicatively coupled to the at least one RF antenna and configured to determine the at least one distance; and
    a second processor communicatively coupled to the first processor and the at least one IMU and configured to determine the one or more motion characteristics.

5. The system of claim 4, further comprising at least one circuit board having the second processor thereon, wherein the first processor is wired to the at least one circuit board.

6. The system of claim 5, wherein:
    the first processor is packaged with the at least one RF antenna; and
    the at least one IMU is disposed on the at least one circuit board.

7. The system of claim 6, further comprising a memory disposed on the at least one circuit board, wherein the at least one processor is configured to store the at least one distance in the memory.

8. The system of claim 1, wherein the at least one RF antenna is configured to receive the RF signals having a center frequency between 3-10 GHz and having a bandwidth of at least 500 MHz.

9. The system of claim 1, wherein the at least one IMU includes a plurality of IMUs.

10. The system of claim 1, wherein the at least one anchor node has a known position.

11. A method of determining motion characteristics of a train traveling along a train track, the method comprising:
    receiving, via at least one RF antenna, RF signals from at least one anchor node positioned proximate the train track;
    receiving, via at least one inertial measurement unit (IMU), IMU data generated responsive to motion of the train along the train track; and
    determining, by at least one processor:
        at least one distance between the at least one RF antenna and the at least one anchor node using at least one of the RF signals received by the at least one RF antenna from the at least one anchor node positioned proximate the train track; and
        one or more motion characteristics of the train by processing the at least one distance and the IMU data using a Bayesian estimation algorithm, wherein processing the at least one distance and the IMU data to determine the one or more motion characteristics includes:

inputting the at least one distance to the Bayesian estimation algorithm;

inputting the IMU data to the Bayesian estimation algorithm; and obtaining the one or more motion characteristics as an output from the Bayesian estimation algorithm produced by the Bayesian estimation algorithm based, at least in part, on the at least one distance and the IMU data.

12. The method of claim 11, wherein the one or more motion characteristics are selected from a group consisting of: position, velocity, acceleration, position uncertainty, velocity uncertainty, and acceleration uncertainty.

13. The method of claim 11, wherein the one or more motion characteristics includes velocity.

14. The method of claim 11, wherein:

determining the at least one distance is performed by a first processor of the at least one processor; and determining the one or more motion characteristics is performed by a second processor of the at least one processor.

15. The method of claim 11, wherein the RF signals have a center frequency between 3-10 GHz and a bandwidth of at least 500 MHz.

16. The method of claim 11, wherein the at least one anchor node has a known position.

* * * * *